US011502322B1

(12) United States Patent
Nana et al.

(10) Patent No.: US 11,502,322 B1
(45) Date of Patent: Nov. 15, 2022

(54) REVERSE ELECTRODIALYSIS CELL WITH HEAT PUMP

(71) Applicants: Rahul S Nana, Panama City, FL (US); Rafael A Feria, Pickens, SC (US)

(72) Inventors: Rahul S Nana, Panama City, FL (US); Rafael A Feria, Pickens, SC (US)

( * ) Notice: Subject to any disclaimer, the term of this patent is extended or adjusted under 35 U.S.C. 154(b) by 0 days.

(21) Appl. No.: 17/662,584

(22) Filed: May 9, 2022

(51) Int. Cl.
    H01M 8/04       (2016.01)
    H01M 8/18       (2006.01)
    H01M 8/22       (2006.01)
    H01M 8/04007    (2016.01)
    C25B 1/04       (2021.01)

(52) U.S. Cl.
    CPC ........... H01M 8/227 (2013.01); C25B 1/04 (2013.01); H01M 8/04007 (2013.01)

(58) Field of Classification Search
    None
    See application file for complete search history.

(56) References Cited

U.S. PATENT DOCUMENTS

| | | |
|---|---|---|
| 4,171,409 A | 10/1979 | Loeb |
| 4,283,913 A | 8/1981 | Loeb |
| 4,390,402 A | 6/1983 | Mani et al. |
| 4,404,081 A | 9/1983 | Murphy |
| 5,238,574 A | 8/1993 | Kawashima et al. |
| 5,421,962 A | 6/1995 | Shvarts et al. |
| 5,496,659 A | 3/1996 | Zito |
| 5,618,507 A | 4/1997 | Olper et al. |
| 5,643,968 A | 7/1997 | Andreola et al. |
| 6,030,535 A | 2/2000 | Hayashi et al. |
| 6,042,701 A | 3/2000 | Lichtwardt et al. |
| 6,187,201 B1 | 2/2001 | Abe et al. |
| 6,569,298 B2 | 5/2003 | Merida-Donis |
| 6,783,682 B1 | 8/2004 | Awerbuch |
| 7,037,430 B2 | 5/2006 | Donaldson et al. |
| 7,127,894 B2 | 10/2006 | Battah |

(Continued)

FOREIGN PATENT DOCUMENTS

| | | |
|---|---|---|
| AU | 2010201962 A1 | 12/2010 |
| BR | MU8702650 U2 | 4/2009 |

(Continued)

OTHER PUBLICATIONS

U.S. Appl. No. 17/662,587, filed May 9, 2022 (33 pages).

(Continued)

*Primary Examiner* — Christopher P Domone
(74) *Attorney, Agent, or Firm* — Fox Rothschild LLP

(57) ABSTRACT

A method of generating electrical power or hydrogen from thermal energy is disclosed. The method includes separating, by a selectively permeable membrane, a first saline solution from a second saline solution, receiving, by the first saline solution and/or the second saline solution, thermal energy from a heat source, and mixing the first saline solution and the second saline solution in a controlled manner, capturing at least some salinity-gradient energy as electrical power as the salinity difference between the first saline solution and the second saline solution decreases. The method further includes transferring, by a heat pump, thermal energy from the first saline solution to the second saline solution, causing the salinity difference between the first saline solution and the second saline solution to increase.

13 Claims, 7 Drawing Sheets

(56) References Cited

U.S. PATENT DOCUMENTS

| | | |
|---|---|---|
| 7,189,325 B2 | 3/2007 | Wobben |
| 7,303,674 B2 | 12/2007 | Lampi et al. |
| 7,550,088 B2 | 6/2009 | Wobben |
| 7,628,921 B2 | 12/2009 | Efraty |
| 7,879,243 B2 | 2/2011 | Al-Mayahi et al. |
| 7,901,577 B2 | 3/2011 | SenGupta et al. |
| 7,914,680 B2 | 3/2011 | Cath et al. |
| 8,029,671 B2 | 10/2011 | Cath et al. |
| 8,062,527 B2 | 11/2011 | Ito et al. |
| 8,083,942 B2 | 12/2011 | Cath et al. |
| 8,099,198 B2 | 1/2012 | Gurin |
| 8,123,948 B2 | 2/2012 | Jensen |
| 8,142,942 B2 | 3/2012 | Imanaka |
| 8,177,978 B2 | 5/2012 | Kurth et al. |
| 8,197,664 B2 | 6/2012 | Murahara |
| 8,216,474 B2 | 7/2012 | Cath et al. |
| 8,323,491 B2 | 12/2012 | Brauns |
| 8,647,509 B2 | 2/2014 | Vora et al. |
| 8,685,249 B2 | 4/2014 | Takeuchi et al. |
| 8,695,343 B2 | 4/2014 | Moe |
| 8,758,954 B2 | 6/2014 | Van Baak et al. |
| 8,834,712 B2 | 9/2014 | Katayama et al. |
| 8,871,074 B2 | 10/2014 | Suh et al. |
| 8,915,378 B2 | 12/2014 | Tokimi et al. |
| 8,932,448 B2 | 1/2015 | Valk et al. |
| 8,956,782 B2 | 2/2015 | Van Berchum et al. |
| 8,956,783 B2 | 2/2015 | Antheunis et al. |
| 8,968,963 B2 | 3/2015 | Van Berchum et al. |
| 8,968,964 B2 | 3/2015 | Antheunis et al. |
| 8,968,965 B2 | 3/2015 | Antheunis et al. |
| 8,980,100 B2 | 3/2015 | Chidambaran |
| 9,067,811 B1 | 6/2015 | Bennett et al. |
| 9,108,169 B2 | 8/2015 | Sano et al. |
| 9,112,217 B2 | 8/2015 | Kim et al. |
| 9,156,714 B2 | 10/2015 | McCluskey et al. |
| 9,216,385 B2 | 12/2015 | Isaias et al. |
| 9,227,168 B1 | 1/2016 | DeVaul et al. |
| 9,242,213 B1 | 1/2016 | Aylesworth |
| 9,278,315 B2 | 3/2016 | Davis et al. |
| 9,297,366 B2 | 3/2016 | Paripati et al. |
| 9,359,998 B2 | 6/2016 | Linnig et al. |
| 9,382,135 B2 | 7/2016 | Moe et al. |
| 9,409,117 B2 | 8/2016 | Ukai et al. |
| 9,433,900 B2 | 9/2016 | Ordonez Fernandez |
| 9,474,998 B2 | 10/2016 | Koo et al. |
| 9,502,720 B2 | 11/2016 | Tsai et al. |
| 9,540,255 B2 | 1/2017 | Kang et al. |
| 9,556,316 B2 | 1/2017 | Antheunis |
| 9,604,178 B1 | 3/2017 | Bharwada et al. |
| 9,611,368 B2 | 4/2017 | Lin |
| 9,675,940 B2 | 6/2017 | Van Berchum et al. |
| 9,688,548 B2 | 6/2017 | Dette et al. |
| 9,751,046 B2 | 9/2017 | Sakai et al. |
| 9,851,129 B1 * | 12/2017 | Tanner ................. H01M 8/227 |
| 9,915,436 B1 | 3/2018 | Feria |
| 9,932,257 B2 | 4/2018 | Prakash et al. |
| 9,938,167 B2 | 4/2018 | Su et al. |
| 9,944,765 B2 | 4/2018 | Antheunis |
| 9,950,297 B2 | 4/2018 | Chang et al. |
| 9,957,169 B2 | 5/2018 | Shinoda et al. |
| 9,982,104 B2 | 5/2018 | Choi et al. |
| 9,988,287 B2 | 6/2018 | Cai |
| 10,029,927 B2 | 7/2018 | Murtha et al. |
| 10,046,280 B2 | 8/2018 | Hayakawa et al. |
| 10,065,868 B2 | 9/2018 | Mshahrani |
| 10,093,747 B2 | 10/2018 | Kurihara et al. |
| 10,118,836 B2 | 11/2018 | Dette et al. |
| 10,144,654 B2 | 12/2018 | Govindan et al. |
| 10,177,396 B2 | 1/2019 | Van Baak |
| 10,189,733 B2 | 1/2019 | Wallace |
| 10,221,491 B2 | 3/2019 | Blunn et al. |
| 10,226,740 B2 | 3/2019 | Wallace |
| 10,308,524 B1 | 6/2019 | Ahmed et al. |
| 10,336,638 B1 | 7/2019 | Bader |
| 10,363,688 B2 | 7/2019 | Moon et al. |
| 10,384,164 B2 | 8/2019 | Iyer |
| 10,384,165 B1 | 8/2019 | Haidar et al. |
| 10,399,878 B2 | 9/2019 | Ukai et al. |
| 10,473,091 B2 | 11/2019 | Halloy et al. |
| 10,562,793 B2 | 2/2020 | Cioanta et al. |
| 10,597,309 B2 | 3/2020 | Mshahrani |
| 10,603,636 B2 | 3/2020 | Bublitz |
| 10,615,441 B2 | 4/2020 | Kaku et al. |
| 10,626,029 B2 | 4/2020 | Lin |
| 10,626,037 B2 | 4/2020 | Lienhard et al. |
| 10,653,976 B2 | 5/2020 | Miki |
| 10,829,913 B1 | 11/2020 | Ahmed et al. |
| 10,830,508 B2 | 11/2020 | Tanner |
| 10,934,181 B2 | 3/2021 | Constantz |
| 10,954,145 B2 | 3/2021 | Ortiz Diaz-Guerra et al. |
| 10,988,391 B2 | 4/2021 | Kim et al. |
| 11,000,806 B2 | 5/2021 | Efraty |
| 11,002,373 B2 | 5/2021 | Fink et al. |
| 11,014,833 B2 | 5/2021 | Weng |
| 11,014,834 B2 | 5/2021 | Janson et al. |
| 11,067,317 B2 | 7/2021 | Feria |
| 11,198,096 B1 | 12/2021 | Efraty |
| 11,198,097 B2 | 12/2021 | Wei et al. |
| 11,220,448 B2 | 1/2022 | Scheu |
| 2004/0013918 A1 | 1/2004 | Merida-Donis |
| 2004/0219400 A1 | 11/2004 | Al-Hallaj et al. |
| 2005/0006295 A1 | 1/2005 | Bharwada |
| 2005/0067352 A1 | 3/2005 | Kontos |
| 2005/0103631 A1 | 5/2005 | Freydina et al. |
| 2006/0263646 A1 | 11/2006 | Seale |
| 2007/0227966 A1 | 10/2007 | Koo et al. |
| 2009/0272692 A1 | 11/2009 | Kurth et al. |
| 2010/0163471 A1 | 7/2010 | Elyanow et al. |
| 2011/0042219 A1 | 2/2011 | Wei et al. |
| 2011/0050158 A1 | 3/2011 | MacDonald et al. |
| 2011/0100218 A1 | 5/2011 | Wolfe |
| 2011/0117395 A1 | 5/2011 | Roodenburg |
| 2011/0309020 A1 | 12/2011 | Rietman et al. |
| 2012/0018365 A1 | 1/2012 | Iyer |
| 2012/0080377 A1 | 4/2012 | Jensen et al. |
| 2012/0132591 A1 | 5/2012 | Zhu et al. |
| 2012/0160753 A1 | 6/2012 | Vora et al. |
| 2013/0001162 A1 | 1/2013 | Yangali-Quintanilla et al. |
| 2013/0101486 A1 | 4/2013 | Liu et al. |
| 2013/0288142 A1 | 10/2013 | Fu et al. |
| 2014/0021135 A1 | 1/2014 | Sawyer et al. |
| 2014/0042089 A1 | 2/2014 | Matsui et al. |
| 2014/0246371 A1 | 9/2014 | Cao et al. |
| 2014/0255813 A1 | 9/2014 | Kingsbury |
| 2014/0308712 A1 | 10/2014 | Hanakawa et al. |
| 2015/0165380 A1 | 6/2015 | Jung et al. |
| 2015/0266762 A1 | 9/2015 | Jang et al. |
| 2016/0016116 A1 | 1/2016 | Ge et al. |
| 2016/0023925 A1 | 1/2016 | Liu |
| 2016/0115061 A1 | 4/2016 | Ukai et al. |
| 2016/0376680 A1 | 12/2016 | Abuhasel et al. |
| 2017/0014758 A1 | 1/2017 | Wilkinson et al. |
| 2017/0098846 A1 | 4/2017 | Watakabe et al. |
| 2017/0152159 A1 | 6/2017 | Stauffer |
| 2017/0173532 A1 | 6/2017 | Ide et al. |
| 2017/0240439 A1 | 8/2017 | Lin |
| 2017/0326499 A1 | 11/2017 | Iyer |
| 2017/0334738 A1 | 11/2017 | Suh |
| 2018/0126336 A1 | 5/2018 | Iyer |
| 2018/0147532 A1 | 5/2018 | Switzer et al. |
| 2018/0169541 A1 | 6/2018 | Anderson |
| 2018/0180034 A1 | 6/2018 | Wei |
| 2018/0326366 A1 | 11/2018 | Kim et al. |
| 2019/0374780 A1 | 12/2019 | Hestekin et al. |
| 2020/0047130 A1 | 2/2020 | Ishii |
| 2020/0061541 A1 | 2/2020 | Herron et al. |
| 2020/0101427 A1 | 4/2020 | Gao et al. |
| 2020/0267894 A1 | 8/2020 | Maisonneuve |
| 2020/0292207 A1 | 9/2020 | Feria |
| 2020/0316354 A1 | 10/2020 | Jeong et al. |
| 2021/0002148 A1 | 1/2021 | Sato et al. |
| 2021/0024375 A1 | 1/2021 | Cen et al. |
| 2021/0054252 A1 | 2/2021 | Novek |
| 2021/0087697 A1 | 3/2021 | Riabtsev et al. |

(56) References Cited

U.S. PATENT DOCUMENTS

| | | |
|---|---|---|
| 2021/0268438 A1 | 9/2021 | Nishiura |
| 2021/0323851 A1 | 10/2021 | Jones et al. |
| 2022/0002170 A1 | 1/2022 | Phatak |

FOREIGN PATENT DOCUMENTS

| | | | |
|---|---|---|---|
| CA | 2604132 A1 | 5/2009 |
| CN | 1208719 A | 2/1999 |
| CN | 1375461 A | 10/2002 |
| CN | 2883340 Y | 3/2007 |
| CN | 101029733 A | 9/2007 |
| CN | 101767840 A | 7/2010 |
| CN | 101891267 A | 11/2010 |
| CN | 101955277 A | 1/2011 |
| CN | 101967017 A | 2/2011 |
| CN | 201746366 U | 2/2011 |
| CN | 102040258 A | 5/2011 |
| CN | 102134137 A | 7/2011 |
| CN | 202054635 U | 11/2011 |
| CN | 202056062 U | 11/2011 |
| CN | 202072502 U | 12/2011 |
| CN | 101358578 B | 5/2012 |
| CN | 202246147 U | 5/2012 |
| CN | 102120663 B | 7/2012 |
| CN | 102747717 A | 10/2012 |
| CN | 202474102 U | 10/2012 |
| CN | 202586809 U | 12/2012 |
| CN | 102211803 B | 1/2013 |
| CN | 102452751 B | 1/2013 |
| CN | 102897800 A | 1/2013 |
| CN | 202729841 U | 2/2013 |
| CN | 102963966 A | 3/2013 |
| CN | 202811178 U | 3/2013 |
| CN | 202811240 U | 3/2013 |
| CN | 202924780 U | 5/2013 |
| CN | 103172189 A | 6/2013 |
| CN | 102627339 B | 7/2013 |
| CN | 102795686 B | 7/2013 |
| CN | 103193304 A | 7/2013 |
| CN | 203112560 U | 8/2013 |
| CN | 203159267 U | 8/2013 |
| CN | 102976559 B | 9/2013 |
| CN | 103362763 A | 10/2013 |
| CN | 203222497 U | 10/2013 |
| CN | 203229396 U | 10/2013 |
| CN | 203360202 U | 12/2013 |
| CN | 103570088 A | 2/2014 |
| CN | 103274488 B | 4/2014 |
| CN | 203530063 U | 4/2014 |
| CN | 102840091 B | 5/2014 |
| CN | 102840092 B | 5/2014 |
| CN | 102840093 B | 5/2014 |
| CN | 102852702 B | 5/2014 |
| CN | 102852703 B | 5/2014 |
| CN | 102852704 B | 5/2014 |
| CN | 203625184 U | 6/2014 |
| CN | 102610844 B | 7/2014 |
| CN | 103101932 B | 7/2014 |
| CN | 103359896 B | 7/2014 |
| CN | 102464343 B | 8/2014 |
| CN | 102812884 B | 8/2014 |
| CN | 103288285 B | 8/2014 |
| CN | 203781962 U | 8/2014 |
| CN | 104098157 A | 10/2014 |
| CN | 104140135 A | 11/2014 |
| CN | 204058158 U | 12/2014 |
| CN | 102757138 B | 1/2015 |
| CN | 104370394 A | 2/2015 |
| CN | 103818978 B | 4/2015 |
| CN | 104534731 A | 4/2015 |
| CN | 204301361 U | 4/2015 |
| CN | 104601042 A | 5/2015 |
| CN | 204334382 U | 5/2015 |
| CN | 204434315 U | 7/2015 |
| CN | 103708665 B | 10/2015 |
| CN | 204689747 U | 10/2015 |
| CN | 105048870 A | 11/2015 |
| CN | 204752255 U | 11/2015 |
| CN | 105110543 A | 12/2015 |
| CN | 204848326 U | 12/2015 |
| CN | 204897499 U | 12/2015 |
| CN | 104071875 B | 1/2016 |
| CN | 105254101 A | 1/2016 |
| CN | 105428089 A | 3/2016 |
| CN | 205088043 U | 3/2016 |
| CN | 104591461 B | 4/2016 |
| CN | 105502756 A | 4/2016 |
| CN | 205133216 U | 4/2016 |
| CN | 205170431 U | 4/2016 |
| CN | 103964527 B | 5/2016 |
| CN | 104649478 B | 5/2016 |
| CN | 105540930 A | 5/2016 |
| CN | 105540953 A | 5/2016 |
| CN | 105540970 A | 5/2016 |
| CN | 103615363 B | 6/2016 |
| CN | 205313150 U | 6/2016 |
| CN | 205328675 U | 6/2016 |
| CN | 105810985 A | 7/2016 |
| CN | 205442690 U | 8/2016 |
| CN | 205472805 U | 8/2016 |
| CN | 105948337 A | 9/2016 |
| CN | 205590347 U | 9/2016 |
| CN | 205590348 U | 9/2016 |
| CN | 205603350 U | 9/2016 |
| CN | 104355473 B | 10/2016 |
| CN | 106058921 A | 10/2016 |
| CN | 106145229 A | 11/2016 |
| CN | 205740453 U | 11/2016 |
| CN | 205740598 U | 11/2016 |
| CN | 106207234 A | 12/2016 |
| CN | 106219648 A | 12/2016 |
| CN | 106242145 A | 12/2016 |
| CN | 106277120 A | 1/2017 |
| CN | 106277121 A | 1/2017 |
| CN | 106277122 A | 1/2017 |
| CN | 106277123 A | 1/2017 |
| CN | 106277124 A | 1/2017 |
| CN | 106277125 A | 1/2017 |
| CN | 106277133 A | 1/2017 |
| CN | 106277134 A | 1/2017 |
| CN | 106277135 A | 1/2017 |
| CN | 106277136 A | 1/2017 |
| CN | 106277137 A | 1/2017 |
| CN | 106348510 A | 1/2017 |
| CN | 106365233 A | 2/2017 |
| CN | 106365234 A | 2/2017 |
| CN | 106379961 A | 2/2017 |
| CN | 106395926 A | 2/2017 |
| CN | 106400879 A | 2/2017 |
| CN | 106430786 A | 2/2017 |
| CN | 205974125 U | 2/2017 |
| CN | 105060380 B | 3/2017 |
| CN | 106477800 A | 3/2017 |
| CN | 104944487 B | 4/2017 |
| CN | 106554103 A | 4/2017 |
| CN | 206098553 U | 4/2017 |
| CN | 104986818 B | 5/2017 |
| CN | 106630359 A | 5/2017 |
| CN | 106242133 B | 6/2017 |
| CN | 106830479 A | 6/2017 |
| CN | 206244450 U | 6/2017 |
| CN | 206279019 U | 6/2017 |
| CN | 104153946 B | 7/2017 |
| CN | 105261808 B | 7/2017 |
| CN | 106981674 A | 7/2017 |
| CN | 206308197 U | 7/2017 |
| CN | 107008155 A | 8/2017 |
| CN | 107165791 A | 9/2017 |
| CN | 107188358 A | 9/2017 |
| CN | 206529357 U | 9/2017 |
| CN | 105439351 B | 10/2017 |
| CN | 105439352 B | 10/2017 |
| CN | 105439353 B | 10/2017 |
| CN | 105439354 B | 10/2017 |

(56) References Cited

FOREIGN PATENT DOCUMENTS

| | | | |
|---|---|---|---|
| CN | 105540968 B | 10/2017 |
| CN | 206592241 U | 10/2017 |
| CN | 107311353 A | 11/2017 |
| CN | 107326387 A | 11/2017 |
| CN | 107522307 A | 12/2017 |
| CN | 104944492 B | 1/2018 |
| CN | 206878725 U | 1/2018 |
| CN | 105502784 B | 3/2018 |
| CN | 207064144 U | 3/2018 |
| CN | 105753104 B | 4/2018 |
| CN | 107922213 A | 4/2018 |
| CN | 107973481 A | 5/2018 |
| CN | 107987844 A | 5/2018 |
| CN | 108083518 A | 5/2018 |
| CN | 108097059 A | 6/2018 |
| CN | 108114599 A | 6/2018 |
| CN | 207478339 U | 6/2018 |
| CN | 108380050 A | 8/2018 |
| CN | 108423733 A | 8/2018 |
| CN | 108439675 A | 8/2018 |
| CN | 108910996 A | 11/2018 |
| CN | 108996616 A | 12/2018 |
| CN | 109020021 A | 12/2018 |
| CN | 208279441 U | 12/2018 |
| CN | 208327445 U | 1/2019 |
| CN | 208394968 U | 1/2019 |
| CN | 105800886 B | 2/2019 |
| CN | 109304088 A | 2/2019 |
| CN | 109311709 A | 2/2019 |
| CN | 109534568 A | 3/2019 |
| CN | 109534585 A | 3/2019 |
| CN | 208639229 U | 3/2019 |
| CN | 109593973 A | 4/2019 |
| CN | 109599572 A | 4/2019 |
| CN | 109607918 A | 4/2019 |
| CN | 106492639 B | 5/2019 |
| CN | 109810254 A | 5/2019 |
| CN | 208916850 U | 5/2019 |
| CN | 103269777 B | 6/2019 |
| CN | 106995253 B | 6/2019 |
| CN | 109867317 A | 6/2019 |
| CN | 109889099 A | 6/2019 |
| CN | 109928561 A | 6/2019 |
| CN | 106587446 B | 7/2019 |
| CN | 109956604 A | 7/2019 |
| CN | 109957885 A | 7/2019 |
| CN | 110104851 A | 8/2019 |
| CN | 110182915 A | 8/2019 |
| CN | 209259726 U | 8/2019 |
| CN | 110204009 A | 9/2019 |
| CN | 209411984 U | 9/2019 |
| CN | 110358143 A | 10/2019 |
| CN | 107158968 B | 11/2019 |
| CN | 110407276 A | 11/2019 |
| CN | 110498523 A | 11/2019 |
| CN | 209567937 U | 11/2019 |
| CN | 209685356 U | 11/2019 |
| CN | 110560179 A | 12/2019 |
| CN | 110601600 A | 12/2019 |
| CN | 209721842 U | 12/2019 |
| CN | 110683693 A | 1/2020 |
| CN | 110734178 A | 1/2020 |
| CN | 110776185 A | 2/2020 |
| CN | 210122508 U | 3/2020 |
| CN | 107158967 B | 4/2020 |
| CN | 109617455 B | 4/2020 |
| CN | 111036098 A | 4/2020 |
| CN | 111056676 A | 4/2020 |
| CN | 210313850 U | 4/2020 |
| CN | 111170517 A | 5/2020 |
| CN | 210620293 U | 5/2020 |
| CN | 108123152 B | 6/2020 |
| CN | 111268754 A | 6/2020 |
| CN | 111282443 A | 6/2020 |
| CN | 111342703 A | 6/2020 |
| CN | 106877742 B | 7/2020 |
| CN | 107265734 B | 7/2020 |
| CN | 110510712 B | 7/2020 |
| CN | 111470704 A | 7/2020 |
| CN | 211056755 U | 7/2020 |
| CN | 111517533 A | 8/2020 |
| CN | 111564884 A | 8/2020 |
| CN | 111573787 A | 8/2020 |
| CN | 211310967 U | 8/2020 |
| CN | 107362694 B | 9/2020 |
| CN | 109179832 B | 9/2020 |
| CN | 109811358 B | 9/2020 |
| CN | 211497236 U | 9/2020 |
| CN | 211595081 U | 9/2020 |
| CN | 106915789 B | 10/2020 |
| CN | 106927541 B | 10/2020 |
| CN | 111744364 A | 10/2020 |
| CN | 111763103 A | 10/2020 |
| CN | 111792743 A | 10/2020 |
| CN | 211644724 U | 10/2020 |
| CN | 111871219 A | 11/2020 |
| CN | 111943398 A | 11/2020 |
| CN | 111995011 A | 11/2020 |
| CN | 111807473 B | 12/2020 |
| CN | 107954528 B | 1/2021 |
| CN | 112266050 A | 1/2021 |
| CN | 212403781 U | 1/2021 |
| CN | 108083369 B | 2/2021 |
| CN | 109802163 B | 2/2021 |
| CN | 112299515 A | 2/2021 |
| CN | 212504155 U | 2/2021 |
| CN | 212504424 U | 2/2021 |
| CN | 212581574 U | 2/2021 |
| CN | 110316913 B | 3/2021 |
| CN | 112436758 A | 3/2021 |
| CN | 112456608 A | 3/2021 |
| CN | 112479314 A | 3/2021 |
| CN | 112479467 A | 3/2021 |
| CN | 112520915 A | 3/2021 |
| CN | 112551624 A | 3/2021 |
| CN | 112569805 A | 3/2021 |
| CN | 108976258 B | 4/2021 |
| CN | 112607806 A | 4/2021 |
| CN | 112610433 A | 4/2021 |
| CN | 112661223 A | 4/2021 |
| CN | 112694180 A | 4/2021 |
| CN | 112707566 A | 4/2021 |
| CN | 109336206 B | 5/2021 |
| CN | 108716447 B | 6/2021 |
| CN | 111628675 B | 6/2021 |
| CN | 112194136 B | 6/2021 |
| CN | 112713808 B | 6/2021 |
| CN | 112892230 A | 6/2021 |
| CN | 112910314 A | 6/2021 |
| CN | 112939321 A | 6/2021 |
| CN | 213416391 U | 6/2021 |
| CN | 108025930 B | 7/2021 |
| CN | 113134305 A | 7/2021 |
| CN | 113137338 A | 7/2021 |
| CN | 113153676 A | 7/2021 |
| CN | 213656765 U | 7/2021 |
| CN | 109250846 B | 8/2021 |
| CN | 110746657 B | 8/2021 |
| CN | 112973463 B | 8/2021 |
| CN | 113233623 A | 8/2021 |
| CN | 113278152 A | 8/2021 |
| CN | 113292144 A | 8/2021 |
| CN | 113321257 A | 8/2021 |
| CN | 113415838 A | 9/2021 |
| CN | 113244779 B | 10/2021 |
| CN | 113461887 A | 10/2021 |
| CN | 214400132 U | 10/2021 |
| CN | 112678930 B | 11/2021 |
| CN | 214571328 U | 11/2021 |
| CN | 214654101 U | 11/2021 |
| CN | 214654190 U | 11/2021 |
| CN | 109534465 B | 12/2021 |
| CN | 109867313 B | 12/2021 |
| CN | 110523296 B | 12/2021 |

(56) References Cited

FOREIGN PATENT DOCUMENTS

| | | |
|---|---|---|
| CN | 215539863 U | 1/2022 |
| DE | 114941 A1 | 9/1975 |
| DE | 2510168 A1 | 9/1976 |
| DE | 2829530 A1 | 1/1980 |
| DE | 2847519 A1 | 5/1980 |
| DE | 2851105 A1 | 5/1980 |
| DE | 19620214 A1 | 10/1996 |
| DE | 19603494 C2 | 2/1998 |
| DE | 19649146 A1 | 5/1998 |
| DE | 19714512 C2 | 6/1999 |
| DE | 10222316 B4 | 5/2004 |
| DE | 202007013079 U1 | 12/2007 |
| DE | 102009051845 A1 | 9/2011 |
| DE | 102014225190 A1 | 6/2016 |
| DK | 166657 B | 6/1993 |
| EA | 31763 B1 | 2/2019 |
| EP | 979801 A1 | 2/2000 |
| EP | 1426097 A1 | 6/2004 |
| EP | 1833595 A1 | 9/2007 |
| EP | 1935479 B1 | 9/2009 |
| EP | 2125173 A1 | 12/2009 |
| EP | 2089142 B1 | 7/2010 |
| EP | 2374760 A1 | 10/2011 |
| EP | 1540019 B1 | 4/2012 |
| EP | 2516561 A1 | 10/2012 |
| EP | 2546201 A1 | 1/2013 |
| EP | 2122736 B1 | 11/2013 |
| EP | 2697512 A1 | 2/2014 |
| EP | 2507515 B1 | 7/2016 |
| EP | 2804682 B1 | 11/2016 |
| EP | 2367613 B1 | 3/2018 |
| EP | 3201140 B1 | 7/2018 |
| EP | 2996989 B1 | 10/2018 |
| EP | 3643683 A2 | 4/2020 |
| EP | 3680847 A1 | 7/2020 |
| EP | 3708544 A1 | 9/2020 |
| EP | 2857441 B1 | 10/2020 |
| EP | 3656461 A4 | 3/2021 |
| EP | 3912707 A1 | 11/2021 |
| EP | 3939692 A1 | 1/2022 |
| ES | 2299396 B1 | 4/2009 |
| ES | 1229209 U | 5/2019 |
| ES | 1229209 Y | 7/2019 |
| ES | 1248815 Y | 9/2020 |
| ES | 2814028 A1 | 3/2021 |
| FR | 2583738 A1 | 12/1986 |
| FR | 2848877 B1 | 4/2012 |
| GB | 2194669 A | 3/1988 |
| GB | 2194855 A | 3/1988 |
| GB | 2197116 A | 5/1988 |
| GB | 2202550 A | 9/1988 |
| GB | 2195818 B | 8/1990 |
| GB | 2442941 A | 4/2008 |
| IL | 72916 A | 9/1987 |
| IL | 147905 | 7/2005 |
| IL | 225697 | 8/2017 |
| IN | 201500935 I1 | 10/2016 |
| IN | 201741039747 A | 12/2017 |
| IN | 202011038480 A | 10/2020 |
| JP | 60168504 A | 9/1985 |
| JP | 63100996 A | 6/1988 |
| JP | 2002306118 A | 10/2002 |
| JP | 2003031255 A | 1/2003 |
| JP | 2003120427 A | 4/2003 |
| JP | 2003305343 A | 10/2003 |
| JP | 2003340439 A | 12/2003 |
| JP | 2004012303 A | 1/2004 |
| JP | 2005049173 A | 2/2005 |
| JP | 03637458 B2 | 4/2005 |
| JP | 4092374 A | 9/2005 |
| JP | 2005268114 A | 9/2005 |
| JP | 2006004797 A | 1/2006 |
| JP | 2006004832 A | 1/2006 |
| JP | 03773437 B2 | 5/2006 |
| JP | 03906677 B2 | 4/2007 |
| JP | 2008103262 A | 5/2008 |
| JP | 2008269807 A | 11/2008 |
| JP | 2009112925 A | 5/2009 |
| JP | 2010077934 A | 4/2010 |
| JP | 2010517746 A | 5/2010 |
| JP | 04629999 B2 | 2/2011 |
| JP | 2011025119 A | 2/2011 |
| JP | 04843908 B2 | 12/2011 |
| JP | 05131952 B2 | 1/2013 |
| JP | 2013181501 A | 9/2013 |
| JP | 2014069181 A | 4/2014 |
| JP | 05713348 B2 | 5/2015 |
| JP | 2015166478 A | 9/2015 |
| JP | 2015202445 A | 11/2015 |
| JP | 2016000995 A | 1/2016 |
| JP | 05862372 B2 | 2/2016 |
| JP | 2016051519 A | 4/2016 |
| JP | 05940387 B2 | 6/2016 |
| JP | 05970664 B2 | 8/2016 |
| JP | 05980521 B2 | 8/2016 |
| JP | 06021739 B2 | 11/2016 |
| JP | 2017025834 A | 2/2017 |
| JP | 2017091857 A | 5/2017 |
| JP | 2017152199 A | 8/2017 |
| JP | 06311089 B2 | 4/2018 |
| JP | 06431658 B2 | 11/2018 |
| JP | 2019072660 A | 5/2019 |
| JP | 2019098205 A | 6/2019 |
| JP | 2020027761 A | 2/2020 |
| JP | 2021502239 A | 1/2021 |
| JP | 2021100744 A | 7/2021 |
| JP | 06956953 B2 | 11/2021 |
| KR | 893565 B1 | 4/2009 |
| KR | 956652 B1 | 5/2010 |
| KR | 1011403 B1 | 1/2011 |
| KR | 2011138464 A | 12/2011 |
| KR | 1109534 B1 | 1/2012 |
| KR | 1131092 B1 | 3/2012 |
| KR | 1184650 B1 | 9/2012 |
| KR | 1184652 B1 | 9/2012 |
| KR | 1190610 B1 | 10/2012 |
| KR | 1200838 B1 | 11/2012 |
| KR | 1206618 B1 | 11/2012 |
| KR | 1239440 B1 | 3/2013 |
| KR | 1245264 B1 | 3/2013 |
| KR | 1297857 B1 | 8/2013 |
| KR | 1311360 B1 | 10/2013 |
| KR | 1328279 B1 | 11/2013 |
| KR | 1328433 B1 | 11/2013 |
| KR | 1328524 B1 | 11/2013 |
| KR | 2013123888 A | 11/2013 |
| KR | 1338187 B1 | 12/2013 |
| KR | 2013143219 A | 12/2013 |
| KR | 1387136 B1 | 4/2014 |
| KR | 1394132 B1 | 5/2014 |
| KR | 1394237 B1 | 5/2014 |
| KR | 2014003731 A | 6/2014 |
| KR | 1431636 B1 | 8/2014 |
| KR | 1454314 B1 | 10/2014 |
| KR | 2014116724 A | 10/2014 |
| KR | 2015046410 A | 4/2015 |
| KR | 1519828 B1 | 5/2015 |
| KR | 1526214 B1 | 6/2015 |
| KR | 1544747 B1 | 8/2015 |
| KR | 1555781 B1 | 9/2015 |
| KR | 2015100091 A | 9/2015 |
| KR | 1557704 B1 | 10/2015 |
| KR | 2015145997 A | 12/2015 |
| KR | 1587592 B1 | 1/2016 |
| KR | 1596301 B1 | 2/2016 |
| KR | 1609795 B1 | 4/2016 |
| KR | 2016054230 A | 5/2016 |
| KR | 2016059438 A | 5/2016 |
| KR | 1632685 B1 | 6/2016 |
| KR | 1641789 B1 | 7/2016 |
| KR | 1643146 B1 | 8/2016 |
| KR | 1647994 B1 | 8/2016 |
| KR | 1668244 B1 | 10/2016 |
| KR | 2016116824 A | 10/2016 |

(56) References Cited

FOREIGN PATENT DOCUMENTS

| | | | |
|---|---|---|---|
| KR | 2016127402 A | 11/2016 |
| KR | 1683602 B1 | 12/2016 |
| KR | 1695881 B1 | 1/2017 |
| KR | 1702850 B1 | 2/2017 |
| KR | 1705783 B1 | 2/2017 |
| KR | 1710006 B1 | 2/2017 |
| KR | 1712408 B1 | 3/2017 |
| KR | 2017023237 A | 3/2017 |
| KR | 2017023238 A | 3/2017 |
| KR | 1723807 B1 | 4/2017 |
| KR | 1726393 B1 | 4/2017 |
| KR | 1730643 B1 | 4/2017 |
| KR | 1751291 B1 | 6/2017 |
| KR | 1758979 B1 | 7/2017 |
| KR | 1766780 B1 | 8/2017 |
| KR | 1778562 B1 | 9/2017 |
| KR | 1789093 B1 | 10/2017 |
| KR | 1815298 B1 | 1/2018 |
| KR | 1822188 B1 | 3/2018 |
| KR | 2018034106 A | 4/2018 |
| KR | 1844275 B1 | 5/2018 |
| KR | 1857444 B1 | 5/2018 |
| KR | 2018081279 A | 7/2018 |
| KR | 1892075 B1 | 8/2018 |
| KR | 1906544 B1 | 10/2018 |
| KR | 1909397 B1 | 10/2018 |
| KR | 2018111229 A | 10/2018 |
| KR | 1918275 B1 | 11/2018 |
| KR | 1946980 B1 | 2/2019 |
| KR | 1933000 B1 | 3/2019 |
| KR | 1966941 B1 | 4/2019 |
| KR | 2019041104 A | 4/2019 |
| KR | 2019058117 A | 5/2019 |
| KR | 1956293 B1 | 6/2019 |
| KR | 1958734 B1 | 7/2019 |
| KR | 2016320 B1 | 8/2019 |
| KR | 2016503 B1 | 9/2019 |
| KR | 2020657 B1 | 9/2019 |
| KR | 2006120 B1 | 10/2019 |
| KR | 2015064 B1 | 10/2019 |
| KR | 2018617 B1 | 11/2019 |
| KR | 2030113 B1 | 11/2019 |
| KR | 2042043 B1 | 11/2019 |
| KR | 2055255 B1 | 1/2020 |
| KR | 2063831 B1 | 1/2020 |
| KR | 2065275 B1 | 1/2020 |
| KR | 2072469 B1 | 2/2020 |
| KR | 2020024695 A | 3/2020 |
| KR | 2020036416 A | 4/2020 |
| KR | 2020073886 A | 6/2020 |
| KR | 2143397 B1 | 8/2020 |
| KR | 2144454 B1 | 8/2020 |
| KR | 2175288 B1 | 11/2020 |
| KR | 2183195 B1 | 11/2020 |
| KR | 2020139009 A | 12/2020 |
| KR | 2021067116 A | 6/2021 |
| KR | 2274447 B1 | 7/2021 |
| KR | 2021102076 A | 8/2021 |
| KR | 2021102077 A | 8/2021 |
| KR | 2297153 B1 | 9/2021 |
| KR | 2021112483 A | 9/2021 |
| KR | 2315033 B1 | 10/2021 |
| KR | 2325186 B1 | 11/2021 |
| KR | 2344835 B1 | 12/2021 |
| KZ | 27309 A4 | 9/2013 |
| KZ | 27310 A4 | 9/2013 |
| MX | 2016001468 A | 7/2016 |
| SG | 10201804036 A1 | 12/2019 |
| SU | 1550292 A1 | 3/1990 |
| TW | I363838 B | 5/2012 |
| TW | 201334847 A | 9/2013 |
| TW | M476844 U | 4/2014 |
| TW | 201909514 A | 3/2019 |
| TW | I717277 B | 1/2021 |
| WO | 1994027913 A1 | 12/1994 |
| WO | 1997016464 A1 | 5/1997 |
| WO | 2001092555 A1 | 12/2001 |
| WO | 2006067240 A1 | 6/2006 |
| WO | 2006072122 A2 | 7/2006 |
| WO | 2006123258 A2 | 11/2006 |
| WO | 2007132477 A1 | 11/2007 |
| WO | 2008053700 A1 | 5/2008 |
| WO | 2009015511 A1 | 2/2009 |
| WO | 2010004819 A1 | 1/2010 |
| WO | 2010008275 A1 | 1/2010 |
| WO | 2010018249 A1 | 2/2010 |
| WO | 2010021158 A1 | 2/2010 |
| WO | 2010108872 A1 | 9/2010 |
| WO | 2010143950 A1 | 12/2010 |
| WO | 2011003874 A1 | 1/2011 |
| WO | 2011050473 A1 | 5/2011 |
| WO | 2011148422 A1 | 12/2011 |
| WO | 2012000558 A1 | 1/2012 |
| WO | 2012025656 A1 | 3/2012 |
| WO | 2012032557 A1 | 3/2012 |
| WO | 2012071994 A1 | 6/2012 |
| WO | 2012099074 A1 | 7/2012 |
| WO | 2012102677 A1 | 8/2012 |
| WO | 2012115114 A1 | 8/2012 |
| WO | 2012161663 A1 | 11/2012 |
| WO | 2013036111 A1 | 3/2013 |
| WO | 2013134710 A1 | 9/2013 |
| WO | 2013154367 A1 | 10/2013 |
| WO | 2013169023 A1 | 11/2013 |
| WO | 2013172605 A1 | 11/2013 |
| WO | 2014058469 A1 | 4/2014 |
| WO | 2014091199 A1 | 6/2014 |
| WO | 2014181898 A1 | 11/2014 |
| WO | 2016056778 A1 | 4/2016 |
| WO | 2017190505 A1 | 11/2017 |
| WO | 2018229505 A1 | 12/2018 |
| WO | 2019164462 A1 | 8/2019 |
| WO | 2020017694 A1 | 1/2020 |
| WO | 2020032356 A1 | 2/2020 |
| WO | 2020068930 A1 | 4/2020 |
| WO | 2020072080 A1 | 4/2020 |
| WO | 2020186665 A1 | 9/2020 |
| WO | 2020237155 A1 | 11/2020 |
| WO | 2020251218 A1 | 12/2020 |
| WO | 2020251568 A1 | 12/2020 |
| WO | 2020259733 A1 | 12/2020 |
| WO | 2021047417 A1 | 3/2021 |
| WO | 2021057558 A1 | 4/2021 |
| WO | 2021071425 A1 | 4/2021 |
| WO | 2021071824 A1 | 4/2021 |
| WO | 2021085979 A1 | 5/2021 |
| WO | 2021090919 A1 | 5/2021 |
| WO | 2021165338 A1 | 8/2021 |
| WO | 2021177823 A1 | 9/2021 |

OTHER PUBLICATIONS

Norwegian University of Science and Technology, https://scitechdaily.com/turning-waste-heat-into-hydrogen-fuel-using-reverse-electrodialysis/, Nov. 23, 2019.

Nuclear Power 2022, https://www.nuclear-power.com/nuclear-engineering/thermodynamics/thernodynamic-cycles/heating-and-air-conditioning/coefficient-of-performance-heat-pump/.

Energy Transition Model, https://docs.energytransitionmodel.com/main/heat-pumps/.

Isidoro Martinez, Heat of Solution Data for Aqueous Solutions, 1995-2022, https://docs.energytransitionmodel.com/main/heat-pumps/.

Saltworks, https://docs.energytransitionmodel.com/main/heat-pumps/.

Krakhella, K. et al. Heat to H2: Using Waste Heat for Hydrogen Production through Reverse Electrodialysis, Energies 2019, 12(18): 3428.

ResearchGate, https://www.researchgate.net/figure/Illustration-of-reverse-electrodialysis-RED-power-generation-system-Internal_fig7_337494612.

(56) References Cited

OTHER PUBLICATIONS

Vermaas, D. et al., Influence of multivalent ions on renewable energy generation in reverse electrodialysis, Energy & Environmental Science, Issue No. 4,2014, https://pubs.rsc.org/en/content/articlelanding/2014/ee/c3ee43501f <https://urldefense.com/v3/_https:/pubs.rsc.org/en/content/articlelanding/2014/ee/c3ee435-01f_;!!A14RNwfIfLzD!Fc3vkktGCsrDwurEjKK31PqBgHJjiB5xAGk03Da88Mo0RBPbGIBnjRJqXvO3jmTjVg$>.

MaterialsToday, Graphene Could Make Tunable Ion Filter, Nov. 27, 2018, https://www.materialstoday.com/computation-theory/news/graphene-could-make-tunable-ion-filter/.

Facchinetti, I. et al., Thermally Regenerable Redox Flow Battery for Exploiting Low-Temperature Heat Sources, Cell Reports Physical Science 1(5): 100056, May 20, 2020.

Palakkal, V. et al., High Power Thermally Regenerative Ammonia-Copper Redox Flow Battery Enabled by a Zero Gap Dell Design, Low-Resistant Membranes, and Electrode Coatings, ACS Appl. Energy Matter, 3(5): 4787-98, 2020.

Moreno, J. et al., Upscaling Reverse Electrodialysis, Environ. Sci. Technol. 52: 10856-63, 2018.

Veerman, J. et al., Reverse electrodialysis: evaluation of suitable electrode systems, Journal of Applied Electrochemistry, 40: 1461-74, 2010.

\* cited by examiner

US 11,502,322 B1

REVERSE ELECTRODIALYSIS CELL WITH HEAT PUMP

FIELD

The present technology is generally related to systems and methods for generating electrical power and/or hydrogen from thermal energy.

BACKGROUND

Salinity gradient power is the energy created from the difference in salt concentration between two fluids, commonly fresh and salt water that naturally occurs, e.g., when a river flows into the sea. Reverse electrodialysis (RED) can be used to retrieve energy from the salinity gradient, e.g., by passing a salt solution and fresh water through a stack of alternating cation and anion exchange membranes. The chemical potential difference between the salt and fresh water generates a voltage over each membrane and the total potential of the system is the sum of the potential differences over all membranes. An open-loop RED battery requires a continuous source of salt and fresh water to maintain the salinity gradient. This constraint may limit practical locations of commercial-scale RED batteries. Furthermore, open-loop RED batteries are susceptible to contamination from minerals, microbes, or other foreign objects or material in the sources of water. Closed-loop RED cells do not require continuous sources of concentrated and dilute saline solutions but do require ongoing regeneration of the salinity difference between the concentrated and dilute solutions which can be energy intensive and/or inefficient.

This document describes methods and systems that are directed to addressing the problems described above, and/or other issues.

SUMMARY

The details of one or more aspects of the disclosure are set forth in the accompanying drawings and the description below. Other features, objects, and advantages of the techniques described in this disclosure will be apparent from the description and drawings, and from the claims.

The present disclosure describes embodiments related to generating electrical power from thermal energy.

A reverse-electrodialysis system includes an anode, a cathode, and one or more cells disposed between the anode and the cathode. At least one of the one or more cells includes a first membrane configured to be selectively permeable to cations and a second membrane configured to be selectively permeable to anions, the second membrane spaced apart from the first membrane. The cell further includes a concentrated saline solution disposed between the first membrane and the second membrane, the first and second membranes separating the concentrated saline solution from a dilute saline solution such that the first membrane selectively allows cations to migrate toward the cathode and the second membrane selectively allows anions to migrate toward the anode, causing a voltage difference between the cathode and the anode. The reverse-electrodialysis system further includes a heat source configured to transfer thermal energy to the concentrated saline solution or the dilute saline solution and a regeneration system including a heat pump. The regeneration system is configured to receive the dilute saline solution from the at least one of the one or more cells and remove (by the heat pump) thermal energy from the dilute saline solution, causing the dilute saline solution to precipitate a salt. The regeneration system is further configured to, after causing the dilute saline solution to precipitate the salt, circulate the dilute saline solution to the at least one of the one or more cells, introduce the precipitated salt into the concentrated saline solution, and cause the precipitated salt to dissolve in the concentrated saline solution.

Implementations of the disclosure may include one or more of the following optional features. In some implementations, the regeneration system is further configured to transfer at least some of the thermal energy removed from the dilute saline solution back to the dilute saline solution after causing salt dissolved in the dilute saline solution to precipitate. In some implementations, the regeneration system is further configured to transfer at least some of the thermal energy removed from the dilute saline solution to the concentrated saline solution, causing the precipitated salt to dissolve in the concentrated saline solution. The heat source may be configured to transfer thermal energy to the concentrated saline solution, causing the precipitated salt to dissolve in the concentrated saline solution. The concentrated saline solution may include an endothermic solution or an exothermic solution. The concentrated saline solution may include a substance having a solubility with a non-linear temperature dependence. In some examples, the first membrane and the second membrane include ion-exchange membranes. The reverse-electrodialysis system may further include a control system configured to coordinate the transfer of heat between one or more heat sources and the reverse-electrodialysis system based on one or more measurements of a state of the one or more heat sources or the reverse-electrodialysis system. The heat source includes one or more of geothermal heat, industrial waste heat, or solar heat.

In some embodiments, the reverse-electrodialysis system includes a second cell. The second cell may include a third membrane configured to be selectively permeable to cations and a fourth membrane configured to be selectively permeable to anions, the fourth membrane spaced apart from the third membrane. The second cell may include a second concentrated saline solution disposed between the third membrane and the fourth membrane, the third and fourth membranes separating the second concentrated saline solution from a second dilute saline solution. The concentrated saline solution mat includes an endothermic solution, the second concentrated saline solution may include an exothermic solution, and the heat pump may be configured to transfer heat between the concentrated saline solution and the second concentrated saline solution.

In an embodiment, a method of generating electrical power from thermal energy is disclosed. The method includes separating, by a selectively permeable membrane, a first saline solution from a second saline solution. The method includes receiving, by the first saline solution and/or the second saline solution, thermal energy from a heat source. The method includes mixing the first saline solution and the second saline solution in a controlled manner, capturing at least some salinity-gradient energy as electrical power as the salinity difference between the first saline solution and the second saline solution decreases. The method includes transferring, by a heat pump, thermal energy from the first saline solution to the second saline solution, causing the salinity difference between the first saline solution and the second saline solution to increase.

Implementations of the disclosure may include one or more of the following optional features. In some implementations, the method further includes capturing the salinity-gradient energy using reverse electrodialysis. In some implementations, the method further includes capturing the salinity-gradient energy pressure-retarded osmosis driving an electrical generator. In some embodiments, each of the first saline solution and the second saline solution circulate in a closed system. Transferring thermal energy from the first saline solution to the second saline solution may cause the first saline solution to precipitate a salt. The method may further include introducing the precipitated salt into the second saline solution, causing the salinity difference between the first saline solution and the second saline solution to increase. The method may further include using a portion of the generated electrical power to produce hydrogen gas through electrolysis. In some examples, transferring thermal energy from the first saline solution to the second saline solution includes transferring thermal energy from the first saline solution that is cooler than the second saline solution.

The method may further include coordinating the transfer of heat from one or more heat sources to the first saline solution and/or the second saline solution based on one or more measurements of a state of the one or more heat sources or the first saline solution and/or the second saline solution. The heat source may include one or more of geothermal heat, industrial waste heat, or solar heat.

BRIEF DESCRIPTION OF DRAWINGS

The accompanying drawings, which are incorporated herein and constitute part of this specification, are illustrative of particular embodiments of the present disclosure and do not limit the scope of the present disclosure.

DETAILED DESCRIPTION

Figure 1:
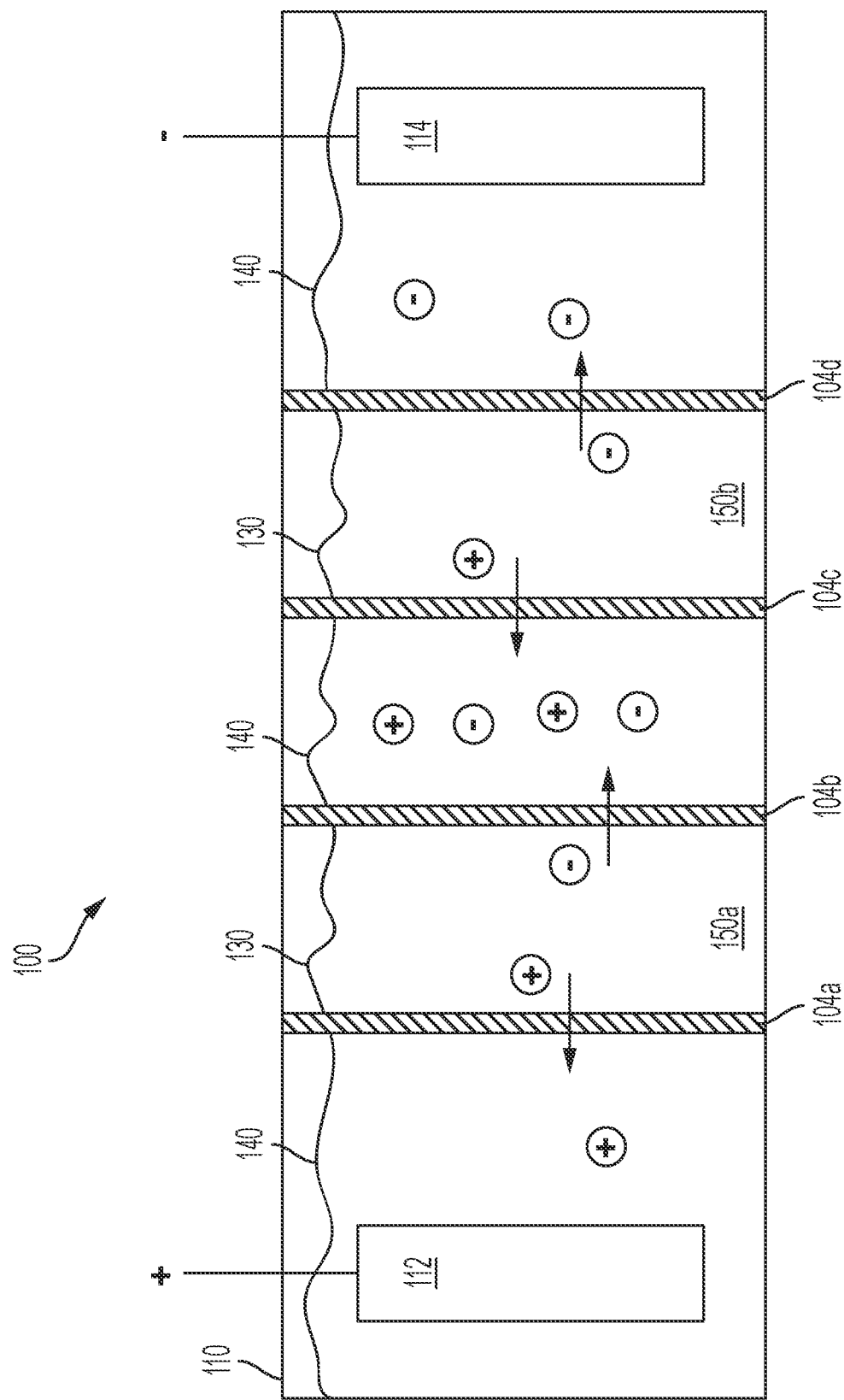
FIG. 1 illustrates an example reverse electrodialysis (RED) system.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

It is also to be understood that the terminology used in the description is for the purpose of describing the particular versions or embodiments only and is not intended to limit the scope of the present disclosure which will be limited only by the appended claims. Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meanings as commonly understood by one of ordinary skill in the art. Although any methods, equipment, and materials similar or equivalent to those described herein can be used in the practice or testing of embodiments of the present disclosure, the preferred methods, devices, and materials are now described. All references mentioned herein are incorporated by reference in their entirety.

As used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other and are not necessarily "superior" and "inferior". Generally, similar spatial references of different aspects or components indicate similar spatial orientation and/or positioning, i.e., that each "first end" is situated on or directed towards the same end of the device.

The systems and methods described in this disclosure are generally directed to efficiently extracting usable energy from the difference in salt concentration between two solutions via a precisely orchestrated and controlled mixing of the two solutions. The systems may be used to directly generate electrical power or to generate hydrogen gas, which can be used as a fuel for generating mechanical (and/or electrical) power or to generate pressure and/or gravitational potential energy, either of which can be used to drive a turbine or perform other useful work. The systems encompass a range of sizes and power outputs. Some embodiments may be configured to generate power at the scale of a single residence or commercial building. In some examples, the systems include industrial power generation systems providing electrical power to a regional or national power grid. In some examples, the systems provide hydrogen fuel, e.g., to power a fleet of vehicles, as well as (or instead of) generating electrical power.

FIG. 1 shows an example system 100 for generating electricity from a salinity gradient. The example system 100 includes a reverse electrodialysis (RED) battery 110. The RED battery 110 includes a cathode 112 and an anode 114 separated by one or more cells 150, 150a, 150b. Each cell 150 contains a salt solution 130, i.e., a liquid mixture of a solvent and a salt that has been dissolved into its anionic and cationic constituent components, such that the ionic constituents are free to move with respect to each other. Each ion may have a single charge or may have multiple changes. In some examples, the solvent and solute are water and sodium chloride (NaCl), respectively. The dissociated ions of NaCl are $Na^+$ and $Cl^-$, each having a single charge. Other solvents and solutes may be used that also form a liquid mixture including anions and cations that are free to move with respect to each other. The salt solution may be exothermic or endothermic. That is, as the solution is formed, the solution may either absorb heat, such as when potassium chlorate ($KClO_3$) or potassium nitrate (KNOB) is dissolved in water, or give off heat, such as when calcium chloride ($CaCl_2$) is dissolved in water.

As shown in FIG. 1, the salt solution 130 is separated from a dilute solution 140 (i.e., a solution having a lower solute concentration than the salt solution) by selectively permeable membranes 104, 104a-d. The salt solution 130 is separated from the dilute solution 140 on one side of the cell 150 by a cation-exchange membrane (104a, 104c) and on the other side of the cell 150 by an anion-exchange membrane (104b, 104d) which is spaced apart from the cation-exchange membrane (104a, 104c). The salt solution 130 is disposed in the space between the cation-exchange membrane (104a, 104c) and anion-exchange membrane (104b, 104d). In the absence of these membranes 104, the salt solution 130 would freely diffuse into the dilute solution 140, equalizing the salinity of the two solutions. The selectively permeable membranes 104 limit the ability of ionic constituents to freely diffuse. Instead, the cation-exchange membranes (104a, 104c) and anion-exchange membranes (104b, 104d) preferentially allow cationic constituents and anionic constituents, respectively, to migrate, or move in opposite directions. The movement of negatively charged ions toward the anode 114 and positively charged ions toward the cathode 112 causes an electrical potential difference (voltage) across the cell 150. The total voltage of the battery 110 includes the voltages of each cell 150.

In some examples, the selectively permeable membranes 104 may be made of organic or inorganic polymer with charged (ionic) side groups, such as ion-exchange resins. The selectively permeable membranes 104 may also be made of graphene, e.g., configured in thin sheets. The permeability of the membrane 104 may depend on configuration or other aspects of the graphene sheets. In some examples, graphene sheets may be stretched or otherwise reconfigured to alter the permeability of the membrane 104. Ions may tend to accumulate near the membranes 104. This accumulation may impede the process of generating power. To counteract this accumulation, the system 100 may apply an agitating or mixing force to the salt solution 130 and/or the dilute solution 140, causing the ions to be distributed more evenly (homogeneously) throughout the solution 130, 140. In some examples, the system 100 applies sonic vibration to one or more solutions 130, 140 to enhance homogeneity of the solution 130, 140. The system 100 may apply sonic vibration to areas of the cell 150 where ions accumulate, e.g., near one or more membranes 104, to effectively enhance homogeneity of one or more solution 130, 140.

As shown in FIG. 1, the electrodes (e.g., cathode 112, anode 114) are surrounded by the dilute solution 140. Alternatively, the electrodes 112, 114 may be surrounded by a rinse solution which is circulated in a closed loop between the electrodes 112, 114 such that the rinse solution is separate from the salt solution 130 and dilute solution 140. In such an arrangement, the outer selectively-permeable membranes 104 (i.e., the membranes 104 closest to the respective electrodes 112, 114 of the RED battery 110) are of the same type (e.g., both anion-exchange membranes or both cation-exchange membranes). For example, a cation-exchange membrane 104 may separate the rinse solution surrounding the cathode 112 from the salt solution 130, and a cation-exchange membrane 104 may also separate the rinse solution surrounding the anode 114 from the dilute solution 140. In this arrangement, the cations that migrate from the salt solution 130 to the electrolyte surrounding the cathode 112 are recirculated to the anode 114, where the cations may pass through the cation-exchange membrane 104 and into the dilute solution 140. Similarly, membranes 104 closest to the respective electrodes 112, 114 may both be anion-exchange membranes, in which case anions are circulated (in the rinse solution) from the anode 114 to the cathode 112, where the anions pass through the anion-exchange membrane 104 into the dilute solution 130. In either configuration, a reduction reaction takes place at the cathode 112 and a balancing oxidation reaction takes place at the anode 114. In some examples, the rinse solution includes a supporting electrolyte to enhance the reactions at the electrodes 112, 114. Because both electrodes 112, 114 are surrounded by the same electrolyte (rinse solution) in this arrangement, the rinse solution may form a resistive load between the electrodes 112, 114, through which current may flow, resulting in a reduction of power output of the RED battery 110. In some examples, the rinse solution and/or associated circulation system may be configured to have a high resistance with respect to the output load of the RED battery 110 or the internal resistance of cells 150 of the RED battery 110. For example, the rinse solution circulation path may be configured to be relatively long.

The electrical current produced by the battery 110 is a function of the rate of ion movement, and the rate of ion movement is a function of several factors, including the salinity gradient (i.e., the salinity difference between the salt solution 130 and the dilute solution 140) and the temperature of (at least) the salt solution 130, as well as aspects of the membranes 104. The temperature of the salt solution 130 affects the rate at which ions in the salt solution 130 move toward (and across) the membranes 104 due to the increased kinetic energy of the ions at higher temperatures. According to the Nernst equation, the power produced is a function of the log of the salinity ration of the salt solution 130 and dilute solution 140. As ions move from the salt solution 130 to the dilute solution 140, however, the salinity of the dilute solution 140 increases and the salinity of the salt solution 130 decreases. Thus the gradient between the "spent" salt solution 130 and the "spent" dilute solution 140 decreases. To maintain electrical current (and therefore, power output) of the battery 110, the salinity difference may be continually regenerated by refreshing the spent salt solution 130 and/or the spent dilute solution 140. To this end, the spent salt solution 130 and/or the spent dilute solution 140 may be circulated (e.g., in a closed loop) between the RED battery 110 and a regeneration system. Alternatively, the spent salt solution 130 and/or the spent dilute solution 140 may be continually replenished, e.g., from natural sources such as rivers and oceans or bays.

Figure 2:
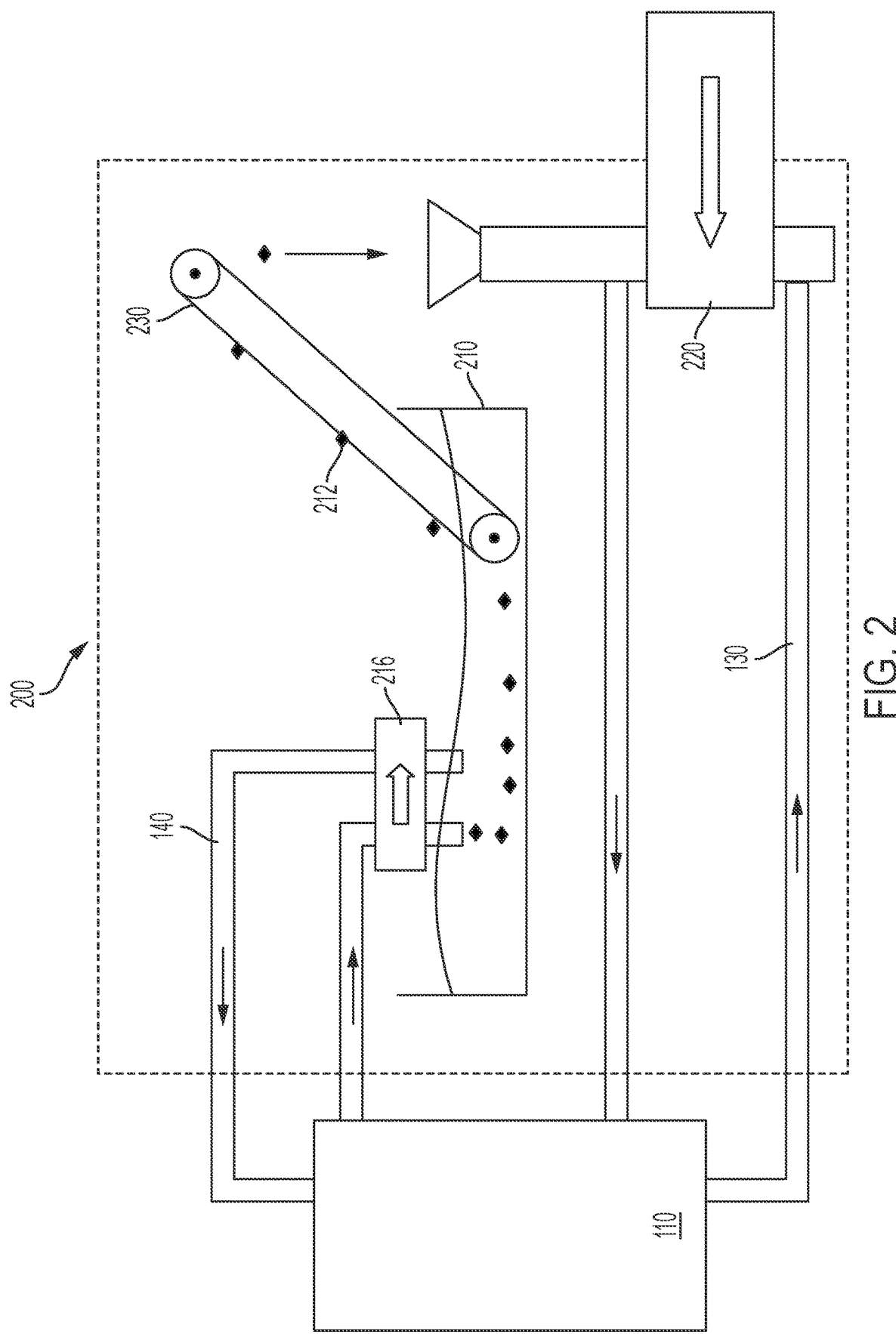
FIG. 2 shows an example regeneration system.

FIG. 2 shows an example regeneration system 200. The example regeneration system 200 includes a salt removal subsystem 210. The regeneration system 200 circulates spent dilute solution 140 in a closed loop from the RED battery 110 through the salt removal subsystem 210 and back to the RED battery 110 as refreshed dilute solution 140. In some examples, the salt removal subsystem 210 evaporates and then condenses the solvent of the dilute solution 140 then circulates the condensed solvent back to the RED battery 110 as refreshed dilute solution 140. The system may evaporate solvent until the remaining dilute solution 140 is close to, or even less than, the solubility limit. The remaining dilute solution 140 may then be reintroduced into the spent salt solution 130 to refresh the salt solution 130. In some examples, the salt removal subsystem 210 evaporates and then condenses the solvent of the salt solution 130 and then circulates the condensed solvent back to the RED battery 110 as refreshed dilute solution 140. In a closed-loop RED battery 110, the salt removal subsystem 210 may evaporate, then condense both the salt solution 130 and the dilute solution 140, circulate the condensed solvent from both solutions back to the RED battery 110 as refreshed dilute solution 140, and circulate the remaining solution back to the RED battery 110 as refreshed (concentrated) salt solution 130. In some examples, the salt removal subsystem 210 decreases the salinity of the dilute solution 140 through the process of salt precipitation, rather than (or in addition to) evaporation, to regenerate the salinity difference between the salt solution 130 and dilute solution 140 in the RED battery 110. Other methods of regenerating the salinity gradient include freezing the spent dilute solution 140, e.g., through Eutectic Chilled Crystallization (ECC), or using microfiltration and/or membrane separation. In some examples, multiple methods are advantageously combined. For example, a precipitation or freezing stage may be enhanced by a subsequent membrane filtration stage in order to optimize the total energy required to separate the salt from the spent dilute solution 140.

As shown in FIG. 2, the example salt removal subsystem 210 removes salt from the spent dilute solution 140 by causing salt to precipitate. Generally, the ability of a solvent to dissolve a solute increases with increased temperature. Conversely, lowering the temperature of a solution below the temperature known as the saturation point (the temperature at which the solution is at its maximum salinity) will generally cause the solute to precipitate. The example salt removal subsystem 210 includes a heat transfer device 216 configured to cool the spent dilute solution 140 to a temperature below the saturation point. If the spent dilute solution 140 is an exothermic solution, the dilute solution 140 will further cool as the salt precipitates. In some examples, the heat transfer device 216 also heats the refreshed dilute solution 140, e.g., back to the temperature of the spent dilute solution 140 prior to cooling. That is, the heat transfer device 216 may transfer some or all of the thermal energy removed from the spent dilute solution 140 back to the refreshed dilute solution 140, as shown by the arrow associated with the heat transfer device 216 of FIG. 2. In this way, the temperature of the refreshed dilute solution 140 entering the RED battery 110 is substantially the same as the temperature of the spent dilute solution 140 leaving the RED cell 150.

In the example salt removal subsystem 210, the precipitated salt 212 settles to the bottom of the salt removal subsystem 210, e.g., in a dense solid form. In some examples, the salt removal subsystem 210 includes a conveying device 230 configured to transport the precipitated salt 212 away from the salt removal subsystem 210. The conveying device 230 may be a belt, pump, Archimedes screw, or other device or system configured to physically transport the precipitated salt 212 away from the salt removal subsystem 210. For example, if the salt is in a solid form, the conveying device 230 may be a mechanical system capable of transporting solid material. In some examples, the removed salt 212 is conveyed to a salt replenishment subsystem 220 where the salt is reintroduced (e.g., redissolved) into the spent salt solution 130, thus refreshing the spent salt solution 130. In a similar manner to how the regeneration system 200 circulates dilute solution 140, the regeneration system 200 may also circulate spent salt solution 130 in a closed loop from the RED battery 110 through the salt replenishment subsystem 220 and back to the RED battery 110 as refreshed salt solution 130. The salt replenishment subsystem 220 may increase the salinity of the salt solution 130 through the process of redissolving the salt removed by the salt removal subsystem 210, thus regenerating the salinity difference between the salt solution 130 and dilute solution 140 in the RED battery 110.

As described above, the ability of solvent to dissolve a solute generally increases with increased temperature. Thus, higher temperatures of the salt solution 130 allow for higher levels of salinity and the accompanying greater differences between the salinity of the salt solution 130 and the dilute solution 140. A solubility curve is a plot of the amount of a solute that a specific amount of solvent can dissolve as a function of temperature. In some examples, a solubility curve associated with a solution is linear. That is, the amount of solute that the solvent can dissolve may change linearly with temperature change over a wide range of temperatures (e.g., the entire range that the solvent is a liquid). In some examples, the amount of solute that the solvent can dissolve changes non-linearly with temperature change. In these cases, the amount of solute that the solvent can dissolve may increase by, e.g., a factor of five or more, even within a narrow range of temperatures. The system 100 may be configured to operate the RED battery 110 within a temperature range where the salinity of the salt solution 130 is high. Dissolving additional salt may require transferring additional heat to the salt solution 130. Furthermore, the system 100 may maintain the temperature of the RED battery 110 at a point above the solubility point to provide a "safety margin," to avoid unwanted precipitation if the salt solution 130 cools below the solubility point.

The salt replenishment subsystem 220 may receive thermal energy from one or more heat sources configured to increase the temperature of the salt solution 130, e.g., to allow additional salt to dissolve. For example, the salt replenishment subsystem 220 may receive waste heat from the heat transfer device 216 of the salt removal subsystem 210. The salt replenishment subsystem 220 may also be configured to receive thermal energy from other heat sources as well, as shown by the arrow associated with the salt replenishment subsystem 220 of FIG. 2. Examples of heat sources include, but are not limited to, geothermal heat, industrial waste heat, solar heat, combustion heat, vapor-compression-cycle waste heat (e.g., from a heat pump), chemical reaction heat, or other forms of heat that are not readily or efficiently converted to usable forms through conventional means, such as a by driving a turbine.

A thermal optimization system may be used to optimize the use of thermal energy with the power generation system 100 described herein. Thermal optimization systems are further described in U.S. Pat. No. 11,067,317, which is hereby incorporated by reference in its entirety. The thermal optimization system may transfer thermal energy from one or more heat sources to one or more heat sinks. Examples of heat sinks include the interior of living or office spaces during cooler seasons of the year, heated swimming pools, saunas, and steam rooms. In these examples, the system may be configured to regulate a temperature by modulating the transfer of thermal energy to a heat sink. For example, the thermal optimization system may monitor the temperature of the heated spaces and/or heated water and modulate the transfer of heat using processor-based logic, such as (but not limited to) running one or more PID feedback loops and/or expert systems. During hotter seasons, the interior spaces may be heat sources. In this case, the processor-based regulation system may modulate the transfer of thermal energy away from these spaces to regulate the temperature.

Figure 3:
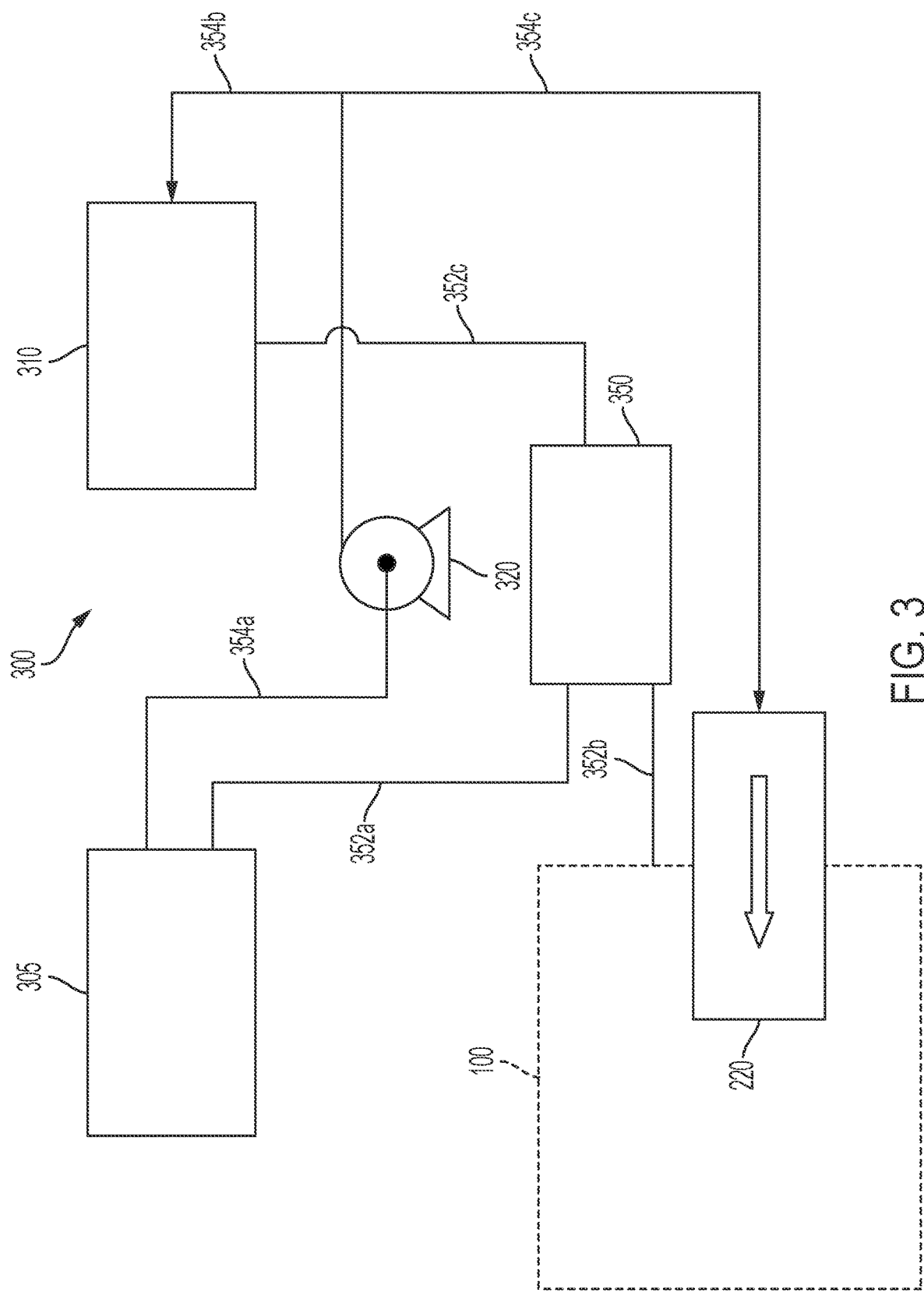
FIG. 3 shows an example thermal optimization system.

FIG. 3 shows an example thermal optimization system 300. The example optimization system 300 includes one or more heat sources 305, one or more heat sinks 310, and one or more RED batteries 110 as described above. In some examples, the power generation system 100 includes a pressure-retarded osmosis (PRO) system (discussed in more detail below), or other systems for generating electricity from a salinity gradient instead of (or in addition to) a RED battery 110. The optimization system 300 may include one or more pumps 320 configured to transfer heat from one location to another. In some examples, the optimization system 300 uses vapor-compression refrigeration to transfer heat from a heat source to a heat sink. That is, the optimization system 300 may compress a refrigerant to transfer thermal energy from the refrigerant to a heat sink (e.g., by a heat exchanger configured for the purpose of absorbing and distributing thermal energy). The optimization system 300 may then transfer the compressed refrigerant (e.g., by pumping the compressed refrigerant via piping configured for the purpose) to a heat source and allow the refrigerant to expand, absorbing thermal energy from the heat source (e.g., via a heat exchanger configured for the purpose of providing thermal energy from the heat source). The vapor-compression refrigeration system may include a reversing valve or other controllable device that causes the transfer of thermal energy to change direction. The optimization system 300 may control the reversing value to change the direction of heat transfer, e.g., to cool an interior space during the day, when ambient temperatures are relatively high, then reverse the heat flow to heat the interior space at night as ambient temperatures drop.

Operation of the thermal optimization system 300 may be coordinated by a control system 350 having a processor, e.g., as described below with respect to FIG. 7. The processor executes instructions causing the control system 350 to coordinate the transfer of heat between heat sources 305, heat sinks 310, and RED batteries 110 (or PRO systems), e.g., based on prevailing conditions. The control system 350 may also coordinate the transfer of heat within the power generation system 100, e.g., between subsystems such as the salt removal subsystem 210 and the salt replenishment subsystem 220. The control system 350 may transmit or receive signals 352, 352a-c to or from the heat sources 305, heat sinks 310, and RED battery 110 (or PRO system). The control system 350 may receive signals 352 indicating one or more conditions or states of, e.g., the heat sources 305, heat sinks 310, and RED battery 110 (or PRO system). For example, the signals 352 may indicate measured quantities such as temperatures and/or pressures, or the signals may indicate user inputs, such as target temperatures for heated interior spaces. Temperatures associated with power generation system 100 may include temperatures of the salt solution 130 and dilute solution 140 in the RED battery, in the salt removal subsystem 210, and/or in the salt replenishment subsystem 220, respectively.

A control system 350 may be used to transmit control signals, e.g., to control the speed of a compressor and/or pump, a direction of a reversing valve, the operating speed of the salt conveying/transfer device 230, etc. to achieve the indicated target temperatures and/or power outputs. For example, the control system 350 may adjust the temperature of the salt solution to be at or near its solubility limit. In this way, the control system 350 may efficiently control and modulate the transfer of heat between several heat sources 305 and heat sinks 310 simultaneously, based on prevailing conditions and user settings, while optimizing the output of the power generation system 100. Furthermore, the control system 350 may affect the level of vapor-compression-cycle waste heat generated by one or more heat pumps 320 and transfer the waste heat to one or more heat sinks and/or to the RED battery 110, thus efficiently recapturing its own waste heat for power generation or other purposes. In this way, the optimization system 300 may transfer heat from any or all of a variety of heat sources, under a variety of dynamic conditions (e.g., as conditions change throughout the year or throughout the day) and/or based on demands of the RED battery 110. Furthermore, the control system 350 may configure the power generation system 100 to store excess energy. For example, when demand for electrical energy is low, the control system 350 may configure the RED battery 110 to produce a portion of its energy output as hydrogen gas to be used as fuel at a later time, rather than as electrical energy to be used at the time of generation. Furthermore, in the case of a PRO system, the control system 350 may configure the rate at which pressure is converted to electricity, e.g., by controlling the rate of flow through a turbine. In this way, the control system 350 may retain some energy in the form of, e.g., gravitational potential energy when demand for electrical power is low and convert greater amounts of the gravitational potential energy to electrical energy when demand for electrical power is high.

Figure 4:
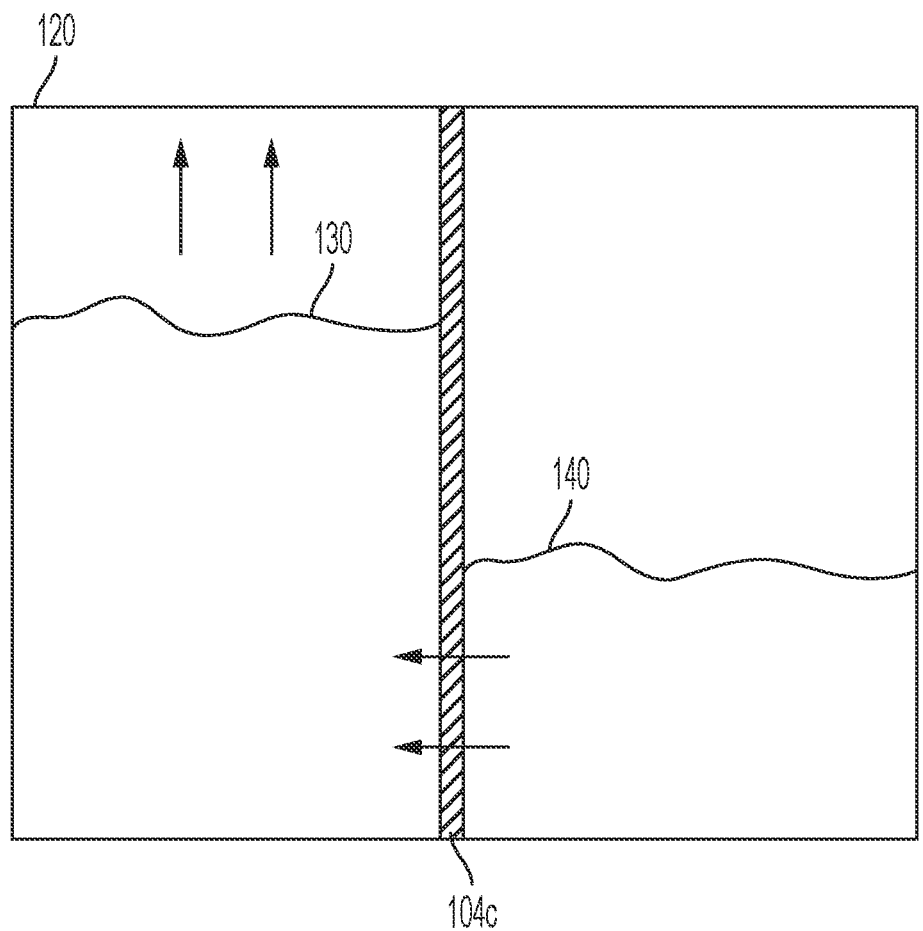
FIG. 4 shows an example pressure-retarded osmosis (PRO) system.

In some embodiments, the system 100 includes a PRO system instead of (or in addition to) the RED battery 110 described above. FIG. 4 shows an example PRO system 120. The example PRO system 120 also includes a salt solution 130 separated from a dilute solution 140 by a selectively permeable membrane 104c, similar to the RED battery 110 described above. However, rather than directly generating electrical power from the salinity difference between the salt solution 130 and the dilute solution 140, the PRO system generates pressure, which may take the form of gravitational potential energy. Therefore, the PRO system may not include electrodes. The selectively permeable membranes of the PRO system may be configured to preferentially allow solvent, rather than solute, to pass through the membrane, e.g., from the dilute solution 140 to the salt solution 130 so as to decrease the salinity difference between the solutions. As a result, the pressure and/or the average height of the solvent in the salt solution 130 may increase over time as solvent migrates across the membrane 104c into the salt solution 130. The system 100 may convert the increased pressure and/or gravitational potential energy of the salt solution 130 into a more usable form of power, such as electrical energy, e.g., by directing the (raised) salt solution 130 through a turbine, paddlewheel, or other suitable mechanism for producing electricity. The system 100 may then circulate the spent salt solution 130 through a solvent removal system similar to the salt removal subsystem 210 described above. For example, the solvent recovery system may remove the excess solvent through evaporation (optionally in a partial vacuum to reduce the boiling point) and subsequent condensation. The solvent recovery system may then circulate the condensed solvent back to the PRO system 120 as refreshed or "make up" dilute solution 140 and circulate the refreshed salt solution (after excess solvent is removed) back to the PRO system 120 as refreshed salt solution 130. Alternatively (or additionally), the solvent recovery system may cause the solute to precipitate out of the spent salt solution 130 before circulating the spent salt solution back to the PRO system 120 as "make up" dilute solution 140 and introducing the precipitated salt back into the salt solution 130, e.g., via the conveying device 230 of FIG. 2. As with the RED battery 110 described above, the rate of power generated by the PRO system 120 is a function at least of the salinity difference between the salt solution 130 and the dilute solution 140 and the temperature of at least the salt solution 130.

As shown in FIG. 1, the salt solution 130 is separated from the dilute solution 140 on one side of the cell 150 by a cation-exchange membrane (104*a*, 104*c*) and on the other side of the cell 150 by an anion-exchange membrane (104*b*, 104*d*). Alternatively, the salt solution 130 and the dilute solution 140 may be separated by a single selectively permeable membrane 140 (e.g., a cation-exchange membrane or an anion-exchange membrane). The selective movement of ions across the single membrane 140 causes an electrical potential difference (voltage) across the membrane 140. Similar to the embodiment of FIG. 1, electrical current produced by a single-membrane embodiment of a RED cell 150 (e.g., a flow pump) is also a function of the rate of ion movement, and the rate of ion movement is a function of several factors, including the salinity gradient between the salt solution 130 and the dilute solution 140, the temperature of (at least) the salt solution 130 (due to the increased kinetic energy of the ions at higher temperatures), and aspects of the single membrane 104.

In some embodiments, the system includes a first RED battery 110*a*, configured to use an exothermic salt solution 130*a*, and a second RED battery 110*b*, configured to use an endothermic salt solution 130*b*. The system may transfer heat generated by dissolving the solute in the exothermic salt solution 130*a* to the endothermic solution 130*b* to replace heat absorbed while dissolving the solute.

Figure 5:
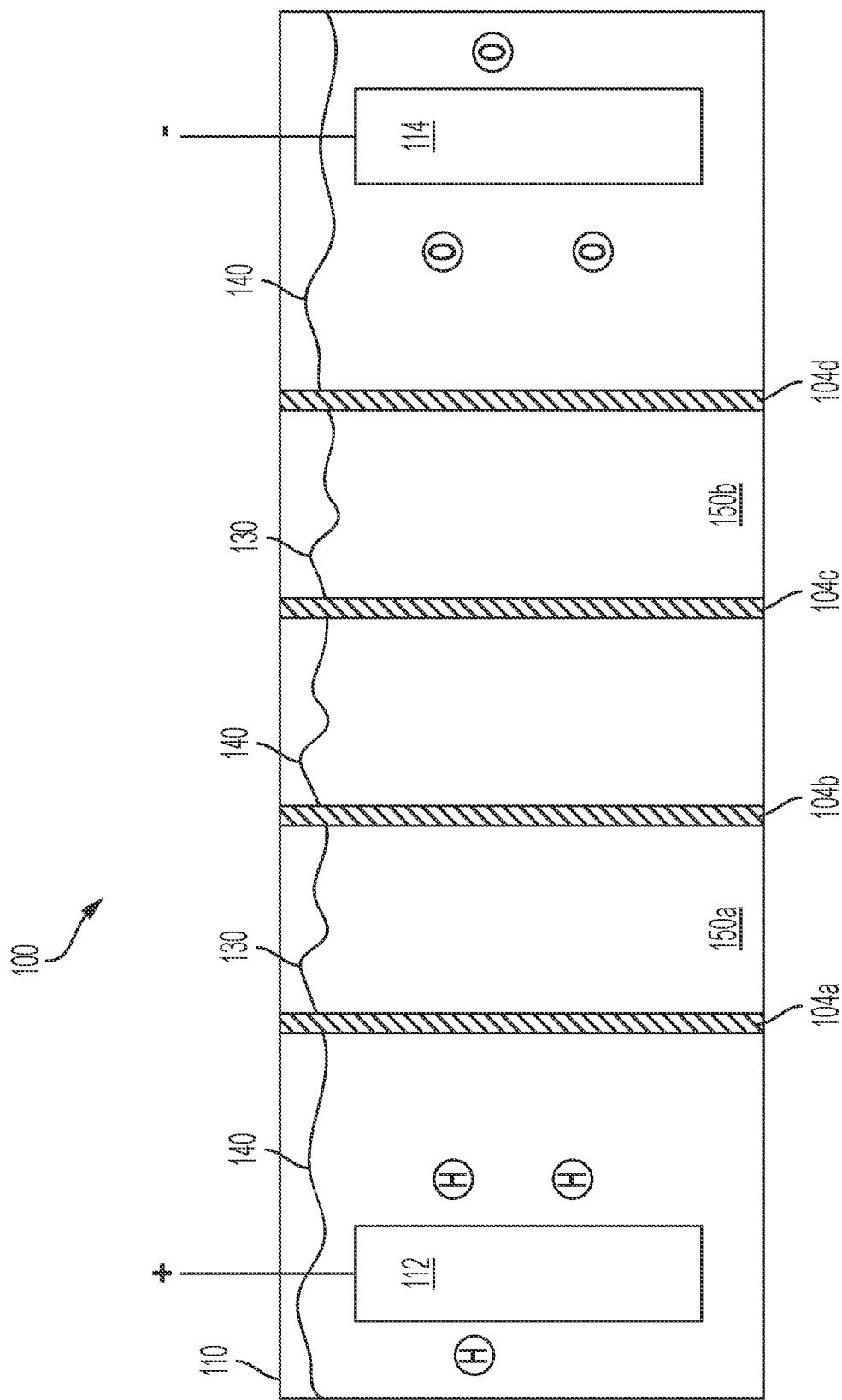
FIG. 5 shows an example hydrogen-generating system.

In some embodiments, a portion of the generated electrical power is used to produce hydrogen gas, e.g., by decomposing water through electrolysis. For example, when the dilute solution is water, a potential difference of 1.23 volts may be applied to the water to split the water into hydrogen and oxygen. Either the salt solution or the dilute solution (or both) may be decomposed through electrolysis. FIG. 5 shows an example RED battery 110 configured to generate hydrogen. The liberated hydrogen and oxygen gases may "bubble" to the surface near the respective cathode 112 and anode 114 of the RED battery 110. The system 100 may separate the oxygen and hydrogen gases (e.g., by physically separating the cathode 112 and anode 114), capture and store the hydrogen (e.g., capture the hydrogen gas as it bubbles to the surface near the cathode), and then transport the hydrogen, by appropriate means and to appropriate locations, for use as a fuel. In these cases, the system 100 must replenish or "make up" the solvent lost to electrolysis, e.g., from a stream or other source of fresh water. The RED battery 110 may be configured such that electrolysis naturally occurs. That is, the RED battery 110 may be configured to generate sufficient potential difference to cause electrolysis of its solvent. In some examples, the regeneration system uses electrolysis to refresh the salinity of the spent salt solution 130 as make up fresh water is circulated to the RED battery 110 (or PRO system) as refreshed dilute solution 140. In some examples, the system includes a separate reservoir of water for generating hydrogen gas through electrolysis (e.g., rather than electrolyzing the solvent of the RED battery or PRO system). The separate water reservoir may have its own "make up" source while the RED battery or PRO system remains closed loop. In these embodiments, the reservoir of water may also act as a heat reservoir or play other role in the heat optimization process.

Figure 6:
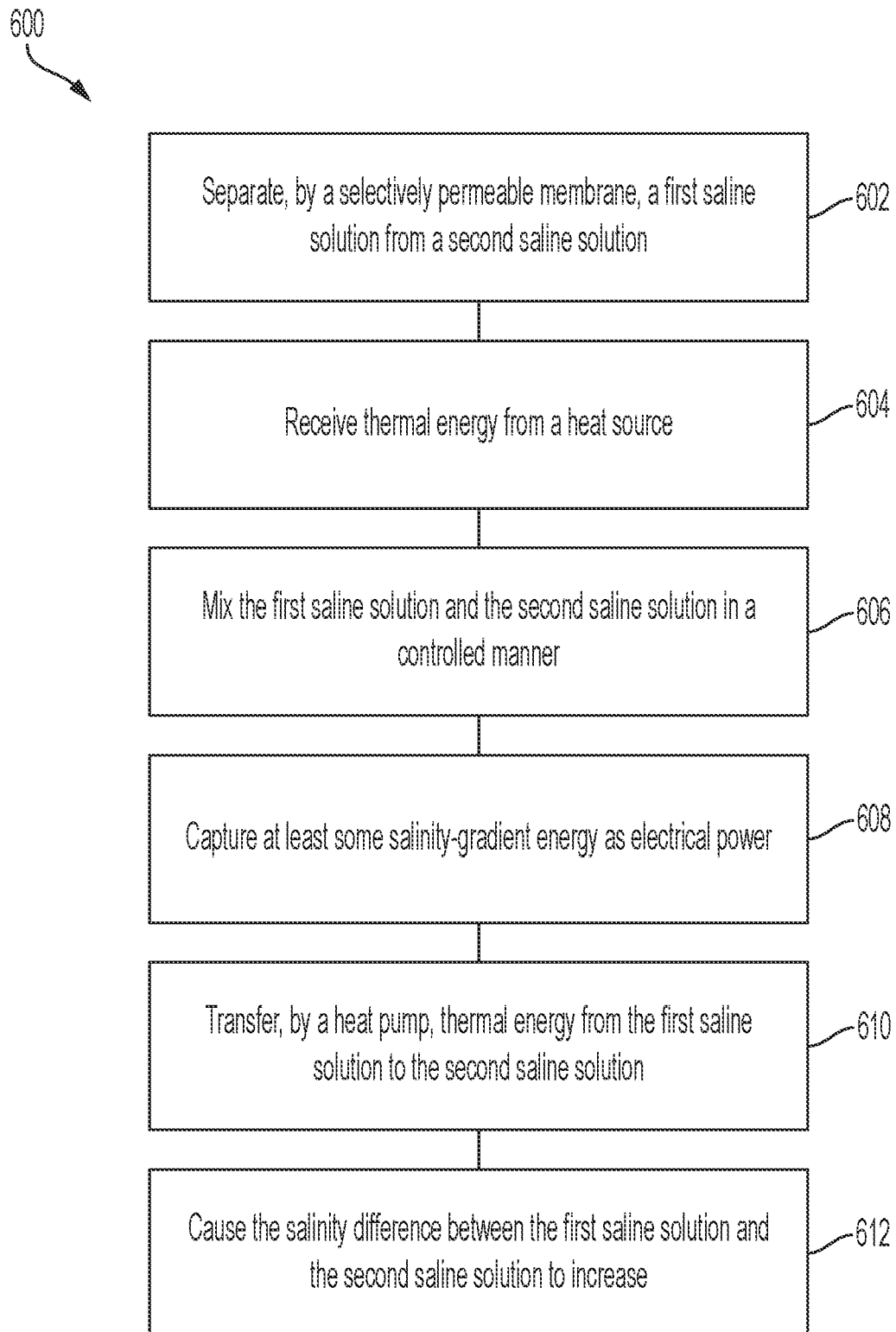
FIG. 6 is a flowchart of a method for generating electrical power from thermal energy.

FIG. 6 shows a flowchart 600 of an example method for generating electrical power from thermal energy. At step 602, the example method includes separating, by a selectively permeable membrane 104, a first saline solution 130 from a second saline solution 140. The selectively permeable membrane 104 may be configured to provide a controlled mixing of the first saline solution 130 and second saline solution 140 so as to capture the salinity-gradient energy in a more useful form as the mixing occurs. In some examples, the selectively permeable membrane 104 is configured to preferentially allow solvent of the first saline solution 130 to pass through the membrane and into the separate second saline solution 140, e.g., as in a PRO system. In some examples, the selectively permeable membrane 104 is configured to preferentially allow either anions or cations of the first saline solution 130 to pass through the membrane and into the separate second saline solution 140, e.g., as in a RED battery 110.

At step 604 the example method includes receiving thermal energy from a heat source. The power generated by the RED battery 110 (or PRO system) is a function of temperature. The received thermal energy may allow the RED battery 110 to continue to operate (e.g., produce electricity). In some examples, the control system 350 is configured to modulate the amount of thermal energy received and to configure which heat sources 305 provide the thermal energy. In some examples, the control system 350 is configured to transfer waste heat from one or more heat pumps 320 to the RED battery 110. In some embodiments, the power generation system 100 provides some or all of the power to operate one or more heat pumps 320. As a prophetic example, a RED battery 110 may have an efficiency of about 30% (i.e., 30% of the thermal energy transferred to the RED battery 110 is converted to electricity or other usable form of energy). A heat pump 320 may have a coefficient of performance (COP) between 3 and 4 (i.e., the heat pump 320 may require 1 KW of power to take up 2-3 KW of power from a heat source and transfer 3-4 KW to a heat sink (the sum of the input power and the thermal power taken up from the heat source). For example, a heat pump 320 with a COP of 4 may require 1 KW of power to transfer a total of 4 KW of heat to the RED battery 110. The heat pump 320 may transfer heat from a low-grade or "waste" heat source, e.g., a source that is not readily converted to a useful form of energy, such as a heat source less than 300 degrees C. In some predicted examples, the heat source may be the result of an industrial process which would otherwise simply output the waste heat to the environment. With an efficiency of 30%, the RED battery 110 may produce 1.2 KW of electrical power from the 4 KW of transferred heat. In this predictive example, 1 KW of the electrical power may be used to power the heat pump 320, leaving 200 W of electrical power for other purposes. Thus, in this predictive example, the combined system 100 of the RED battery 110 and heat pump 320 produces a net output of 200 W of electrical power with no net input of power other than the 3 KW of "waste" heat. In cases where the waste heat is the result of an industrial process, it is predicted that the combined system 110 of the RED battery 110 and heat pump 320 produces a net output of 200 W while simultaneously providing the benefit of cooling the waste heat by 3 KW before outputting it to the environment. The anticipated net efficiency of the combined system 110 may be further amplified with improvements to the efficiency of the RED battery 110.

Furthermore, the power generation system 100 may enhance the effective coefficient of performance (COP) of a heat pump 320, e.g., a heat pump used to heat or cool an inhabited space, by capturing some waste energy produced by one or more heat pumps and converting the waste energy into electrical energy to power the heat pump 320. For example, a heat pump with a heating COP of 3 may require 1.5 KW of power to pump 3 KW of heat from a source to a sink. If the heat sink does not require the full 4.5 KW of power (3 KW of pumped heat plus up to 1.5 KW of waste heat), the control system 350 may configure the optimization system 300 to transfer some or all of the waste heat to the RED battery 110 for conversion to power for the heat pump 320, increasing the effective COP of the heat pump 320. Furthermore, the control system 350 may configure the power generation system 100 to convert some amount to waste energy into a form which can be stored for later use, e.g., if the instantaneous demand for electrical power is greater than the amount of electrical power that can be produced. For example, a PRO system may retain waste energy in the form of unreleased pressure and/or gravitational potential energy, to be released at a future time, e.g., when demand for electrical energy is greater. Similarly, a RED battery 110 may produce hydrogen gas, to be used as fuel at a future time, in lieu of a producing some amount of electrical energy. Thus, waste heat from the heat pump 320 may be flexibly captured and released to further increase the effective COP of the heat pump.

At step 606 the example method includes mixing the first saline solution 130 and the second saline solution 140 in a controlled manner. At step 608, the example method includes capturing at least some salinity-gradient energy as electrical power. As described above, the RED battery 110 or PRO system may be configured such that as the solutions (130, 140) mix, the salinity-gradient energy is converted into a more useful form. At step 610, the example method includes transferring, by a heat pump 320, thermal energy from the first saline solution to the second saline solution. At step 612 the example method includes causing the salinity difference between the first saline solution and the second saline solution to increase. As described above, the heat pump 320 may cool the spent dilute solution 140, causing the salt to precipitate from the dilute solution 140, thus refreshing the dilute solution. The heat pump may transfer the heat from the spent dilute solution 140 to the spent salt solution 130, enhancing the process of dissolving salt introduced into the salt solution 130. Alternatively (or in addition), the heat pump 320 may heat the spent salt solution 140, causing the salt solution 140 to evaporate, thus refreshing the salt solution. The evaporated solvent may be condensed (e.g., cooled by the heat pump) as the solvent vapor is circulated back to the RED battery 110 as refreshed dilute solution.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a RED battery, a PRO system, a hydrogen generation subsystem, a salt precipitation subsystem, an evaporation subsystem, etc.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Figure 7:
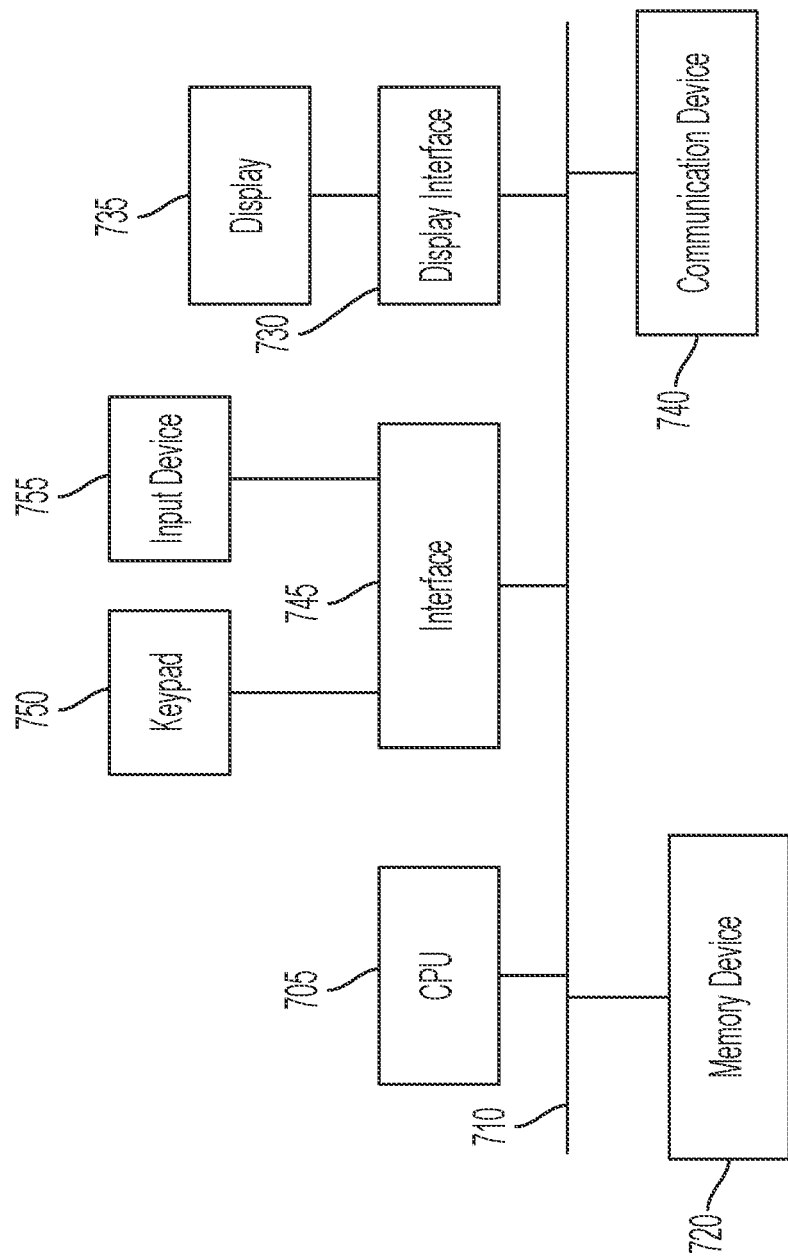
FIG. 7 shows a block diagram of an example of internal hardware that may be used to contain or implement program instructions according to an embodiment.

FIG. 7 illustrates example hardware that may be used to contain or implement program instructions. A bus 710 serves as the main information highway interconnecting the other illustrated components of the hardware. Central Processing Unit (CPU) 705 is the central processing unit of the system, performing calculations and logic operations required to execute a program. CPU 705, alone or in conjunction with one or more of the other elements disclosed in FIG. 7, is an example of a processor as such term is used within this disclosure. Read only memory (ROM) and random-access memory (RAM) constitute examples of non-transitory computer-readable storage media 720, memory devices or data stores as such terms are used within this disclosure.

Program instructions, software or interactive modules for providing the interface and performing any querying or analysis associated with one or more data sets may be stored in the memory device 720. Optionally, the program instructions may be stored on a tangible, non-transitory computer-readable medium such as a compact disk, a digital disk, flash memory, a memory card, a universal serial bus (USB) drive, an optical disc storage medium and/or other recording medium.

An optional display interface 730 may permit information from the bus 710 to be displayed on the display 735 in audio, visual, graphic or alphanumeric format. Communication with external devices may occur using various communication ports 740. A communication port 740 may be attached to a communications network, such as the Internet or an intranet.

The hardware may also include an interface 745 which allows for receipt of data from input devices such as a keypad 750 or other input device 755 such as a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also, that various presently unforeseen or unanticipated alternatives, modifications, variations or improvements therein may be subsequently made by those skilled in the art which are also intended to be encompassed by the following claims.

What is claimed is:

1. A method of generating electrical power from thermal energy comprising:

separating, by a selectively permeable membrane, a first saline solution from a second saline solution;

applying a stretching force to the selectively permeable membrane to adjust the permeability of the membrane;

transferring, by a heat pump, thermal energy to the first saline solution and/or the second saline solution; and mixing the first saline solution and the second saline solution in a controlled manner, capturing at least some salinity-gradient energy as electrical power as the salinity difference between the first saline solution and the second saline solution decreases.

2. The method of claim 1, wherein the selectively permeable membrane comprises a graphene membrane.

3. The method of claim 1, further comprising applying sonic vibration to the first saline solution or the second saline solution, causing the first saline solution or the second saline solution to become more homogenous.

4. The method of claim 3, wherein the sonic vibration is applied adjacent to the selectively permeable membrane.

5. The method of claim 1, further comprising, by a processor, coordinating the transfer of heat from one or more heat sources to the first saline solution and/or the second saline solution based on one or more measurements of a state of the one or more heat sources or the first saline solution and/or the second saline solution.

6. The method of claim 5, wherein the heat sources comprises one or more of geothermal heat, industrial waste heat, or solar heat.

7. The method of claim 1, further comprising capturing the salinity-gradient energy using reverse electrodialysis.

8. The method of claim 1, further comprising capturing the salinity-gradient energy using pressure-retarded osmosis driving an electrical generator.

9. The method of claim 1, wherein each of the first saline solution and the second saline solution circulate in a closed system.

10. The method of claim 1, wherein transferring thermal energy from the first saline solution to the second saline solution causes the first saline solution to precipitate a salt.

11. The method of claim 1, further comprising introducing the precipitated salt into the second saline solution, causing the salinity difference between the first saline solution and the second saline solution to increase.

12. The method of claim 1, further comprising using a portion of the generated electrical power to produce hydrogen gas through electrolysis.

13. The method of claim 1, wherein transferring thermal energy from the first saline solution to the second saline solution comprises transferring thermal energy from the first saline solution that is cooler than the second saline solution.

* * * * *